US009055386B2

(12) United States Patent
Evans et al.

(10) Patent No.: US 9,055,386 B2
(45) Date of Patent: *Jun. 9, 2015

(54) ENDPOINT-HOSTED HYPERVISOR MANAGEMENT

(75) Inventors: James B. Evans, Orinda, CA (US);
Jonathan S. Fan, Oakland, CA (US);
Dennis S. Goodrow, Santa Rosa, CA (US); Benjamin J. Kus, Alameda, CA (US); Peter B. Loer, Oakland, CA (US);
Jason E. Mealins, San Francisco, CA (US); Gregory M. Toto, Piedmont, CA (US); Amrit T. Williams, Alamo, CA (US)

(73) Assignee: International Business Machines Corporation, Armonk, NY (US)

( * ) Notice: Subject to any disclaimer, the term of this patent is extended or adjusted under 35 U.S.C. 154(b) by 1080 days.

This patent is subject to a terminal disclaimer.

(21) Appl. No.: 13/048,700

(22) Filed: Mar. 15, 2011

(65) Prior Publication Data

US 2011/0167472 A1 Jul. 7, 2011

Related U.S. Application Data

(62) Division of application No. 12/917,344, filed on Nov. 1, 2010, now Pat. No. 8,621,460.

(60) Provisional application No. 61/257,356, filed on Nov. 2, 2009.

(51) Int. Cl.
*H04L 29/06* (2006.01)
*H04W 4/00* (2009.01)
*G06F 9/455* (2006.01)

(52) U.S. Cl.
CPC .............. *H04W 4/003* (2013.01); *H04W 4/001* (2013.01); *G06F 9/45541* (2013.01)

(58) Field of Classification Search
CPC ............ G06F 9/45541; G06F 9/45533; G06F 9/45537; G06F 21/60; G06F 21/70; G06F 21/71; H04L 63/10; H04W 4/001; H04W 4/003
USPC .......................... 726/1, 4, 17, 26; 718/1, 100
See application file for complete search history.

(56) References Cited

U.S. PATENT DOCUMENTS 7,761,573 B2 * 7/2010 Travostino et al. ........... 709/226
7,765,374 B2 * 7/2010 Field et al. .................... 711/163
(Continued)

OTHER PUBLICATIONS

International Search Report, mailed Jan. 4, 2011, in related PCT patent application No. PCT/US10/55122, 11 pages.
(Continued)

*Primary Examiner* — Sarah Su
(74) *Attorney, Agent, or Firm* — Stephen J. Walder, Jr.; Jeffrey S. LaBaw

(57) ABSTRACT

A client hypervisor comprises a virtual agent that runs outside of a system OS and that allows device management independent of the OS and user. The virtual agent is tied to a device and not a specific instance of the OS. Such client hypervisors expose new functionality to ease managing systems. Some of these capabilities come from the persistence and privileges outside the OS. In some embodiments of the invention, this new management functionality is exposed to allow device management via new virtualization concepts, such as multiple VMs per system, VM replacement, snapshot/rollback, etc.

20 Claims, 19 Drawing Sheets

(56) References Cited

U.S. PATENT DOCUMENTS

| | | | |
|---|---|---|---|
| 8,413,144 B1* | 4/2013 | Manmohan et al. | 718/1 |
| 8,443,440 B2* | 5/2013 | McGee | 726/22 |
| 8,677,449 B1* | 3/2014 | Beda, III | 726/1 |
| 2005/0188171 A1 | 8/2005 | McIntosh | |
| 2005/0251806 A1* | 11/2005 | Auslander et al. | 718/100 |
| 2006/0294238 A1* | 12/2006 | Naik et al. | 709/226 |
| 2007/0028244 A1 | 2/2007 | Landis et al. | |
| 2007/0180448 A1 | 8/2007 | Low et al. | |
| 2008/0046581 A1 | 2/2008 | Molina et al. | |
| 2008/0184373 A1 | 7/2008 | Traut et al. | |
| 2008/0196043 A1* | 8/2008 | Feinleib et al. | 719/319 |
| 2008/0222633 A1* | 9/2008 | Kami | 718/1 |
| 2008/0244254 A1* | 10/2008 | Cromer et al. | 713/2 |
| 2009/0234974 A1* | 9/2009 | Arndt et al. | 709/250 |
| 2010/0125855 A1* | 5/2010 | Ferwerda et al. | 719/317 |
| 2010/0199351 A1 | 8/2010 | Protas | |
| 2010/0306764 A1 | 12/2010 | Khanna | |
| 2011/0010428 A1 | 1/2011 | Rui et al. | |
| 2011/0087874 A1* | 4/2011 | Timashev et al. | 713/100 |
| 2011/0107331 A1 | 5/2011 | Evans et al. | |
| 2011/0167473 A1 | 7/2011 | Evans | |
| 2011/0321044 A1* | 12/2011 | Huh et al. | 718/1 |
| 2013/0152087 A1* | 6/2013 | Hendel | 718/1 |
| 2013/0167146 A1* | 6/2013 | Dong et al. | 718/1 |
| 2014/0196034 A1* | 7/2014 | Amano et al. | 718/1 |

OTHER PUBLICATIONS

U.S. Appl. No. 12/917,344.
U.S. Appl. No. 13/048,712.

* cited by examiner

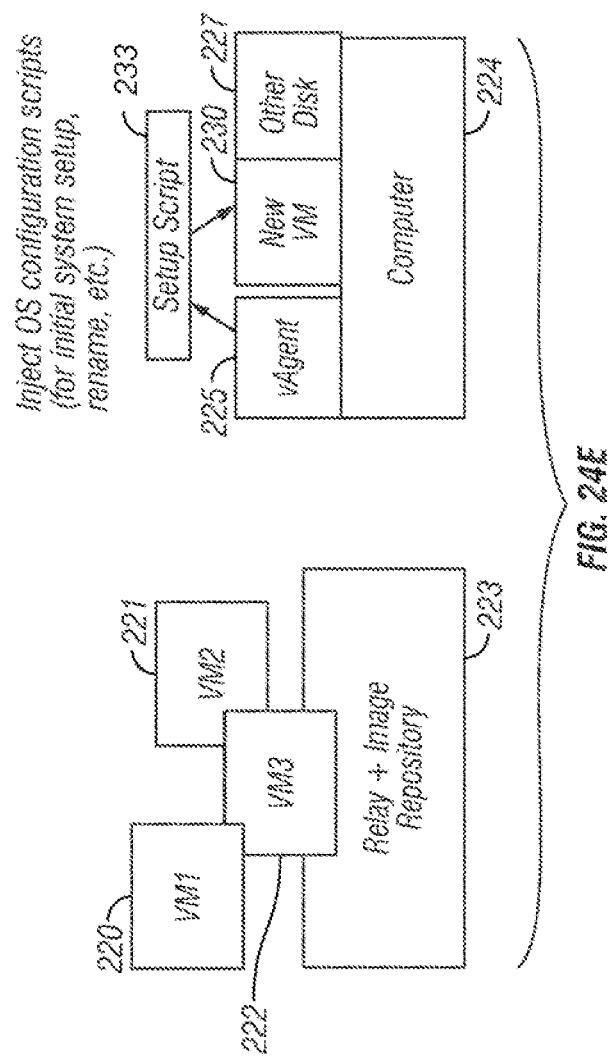

ENDPOINT-HOSTED HYPERVISOR MANAGEMENT

CROSS REFERENCE TO RELATED APPLICATIONS

This application is a divisional of U.S. patent application Ser. No. 12/917,344, filed Nov. 1, 2010, which claims priority to U.S. provisional patent application Ser. No. 61/257,356, filed Nov. 2, 2009, each of which is incorporated herein in its entirety by this reference thereto.

BACKGROUND

1. Technical Field

The invention relates to electronic networks. More particularly, the invention relates to endpoint-hosted hypervisor management.

2. Description of the Background Art

There has lately been great interest in virtualization technologies of all forms. Many virtualization technologies enhance or replace core solutions that various companies currently offer. It is thus de rigueur that information technology companies become very familiar and work with emerging virtualization technologies wherever possible to stay relevant and deliver customer value.

One approach is to provide server-hosted virtualization technologies. While server-hosted virtualization technologies are useful for task workers, such approach has serious drawbacks: It is expensive, requiring a data center, storage, and network facilities; there are serious latency and network issues; server hosting gives rise to centralization of failure; and such approach handles mobile computers poorly. It would therefore be advantageous to provide improved approaches to the use of virtualization technology, especially with regard to electronic networks.

BRIEF SUMMARY

An embodiment of the invention provides a client hypervisor. One of the management benefits of client hypervisors involves managing a system outside of the operating system (OS), as well as providing additional management capabilities.

Running management agents inside of the OS is required for many management functions, such as installing software, managing configurations, etc. But, management agents suffer from many problems when running inside the OS, such as the fact that customers frequently give administrative access to their end users, and any user with administrative access can disable management agents. Further, many types of malware attempt to disable management agents. An embodiment of the invention provides the capability to run an agent that is not contained in the OS, and thus gives a new level of persistence and control to an organization IT staff.

This embodiment of the invention provides a virtual agent, referred to herein as a vAgent, that runs outside of the system OS and that allows organizations a way to manage a device independent of the OS and user. Thus, users do not interact directly with the vAgent because its only job is to allow central management of the device. The vAgent is tied to the device and not the specific instance of the OS. This arrangement helps organizations track devices vs. OSes/Virtual Machines (VMs) and helps organizations maintain visibility into OSes/VMs in which the user has full control.

Client hypervisors expose new functionality to ease managing systems. Some of these capabilities come from the persistence and privileges outside the OS. In some embodiments of the invention, this new management functionality is exposed to allow device management via new virtualization concepts, such as multiple VMs per system, VM replacement, snapshot/rollback, etc.

The following capabilities are provided by the invention to help manage a system:
OS/Image deployment—Deploy, delete, and manage images;
Disk Mgmt—Allocate, partition, and assign disks to VMs;
Device Mgmt—Assign, remove, and set permissions of devices for VMs;
Introspection—"look inside" the VMs from the vAgent;
Snapshot/Rollback—Take snapshots of system states; and
VM Channel—Communicate between VMs and with the vAgent.

The invention also allows the following new functionality:
Enterprise-wide visibility—Much less worry about disabled management agents;
VM Deployment/Migration—Bring a new VM to the system, e.g. for OS upgrade, break/fix, backup VM, etc.;
End-of-Life VM—Delete VMs and confirm data is gone;
User Data Drive—Separate user data to allow multiple VMs to access data;
"Kiosk/Lab Mode"—Revert to previous state in specific environments;
Device Control—Control which VMs/users can access different system devices, such as USB storage devices; and
Offline updates for VMs—Update in the background.

BRIEF DESCRIPTION OF THE SEVERAL VIEWS OF THE DRAWINGS

FIGS. 24*a*-24*e* are block schematic diagrams of a computer architecture showing a reimaging operation according to the invention;

DETAILED DESCRIPTION

This document discusses basic functionality and outlines specifics regarding capabilities of components within a virtual management platform. Further discussed are specific use-cases, for example:

Provisioning
End of life
Removable Device Management
Emergency Partition
Relay
Protected Process
Data Drive
Persistence Mode
Offline patching and configuration management This document also covers advanced features enabled by the use of a vAgent, specifically:

Snapshot/Rollback
Security partition, including out-of-band malware and traffic filtering
Remote control even when the desktop OS does not boot
Disk encryption
Trusted Computing Platform
Dual VMs
Terminology Specific terminology used in this document has the following meaning.

Hypervisor—sometimes called the VMM virtual machine monitor.

CHVD—the client hosted virtual desktop, in a presently preferred embodiment, Linux modified with a hypervisor.

Administrative environment—sometimes known as domain 0 or dom0.

vServer—A container abstracted from the administrative environment that can host many components of the virtual management platform.

Agent—an agent, such as the BigFix agent.

Administrative agent—name used to distinguish agent inside the administrative environment.

VM agent—name used to distinguish agent running inside VM.

AgentHelper—a helper application that encapsulates operations on virtual machines.

Notification forwarder—operational equivalent of relay registration/message forwarding logic.

VMP—the virtual management platform, also referred to as the virtual management appliance (VMA) or vAgent, this is the term used to refer to the following software: Administrative agent, VMPAdmin API, AgentHelper, Notification-Forwarder, VM agent, and VMPGuest API.

VMPAdmin API—API used to get/set properties and perform administrative operations by the Administrative agent.

VMPGuest API—API agent running in a guest virtual machine uses to perform operations.

Bridged Mode, where administrative environment, vServer, and each VM have their own publically addressable IP.

NAT mode, where the administrative environment has a publically addressable IP, all others have NAT addresses.

Discussion

Figure 1:
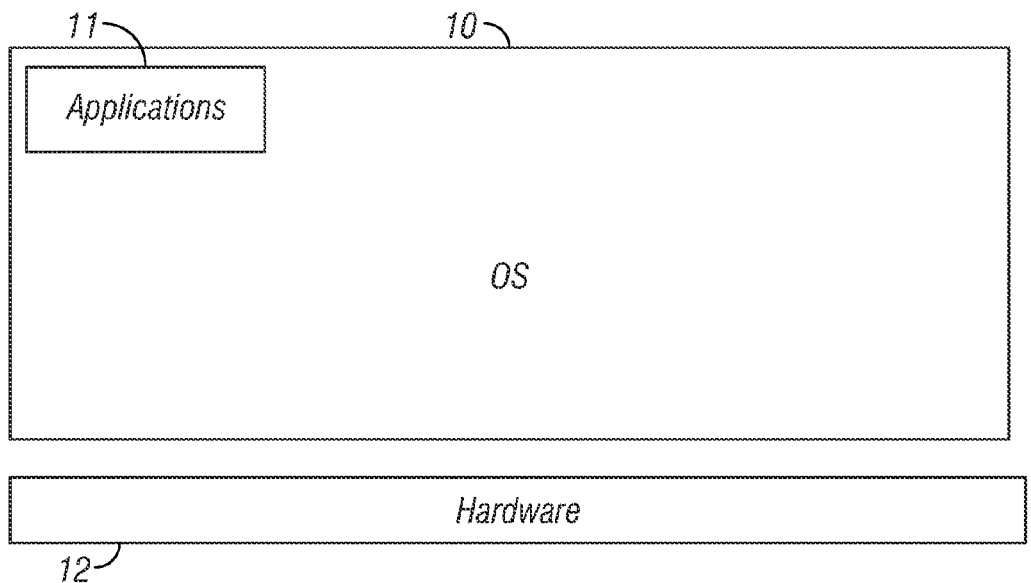
FIG. 1 is a block schematic diagram of a state of the art computer architecture.
Figure 2:
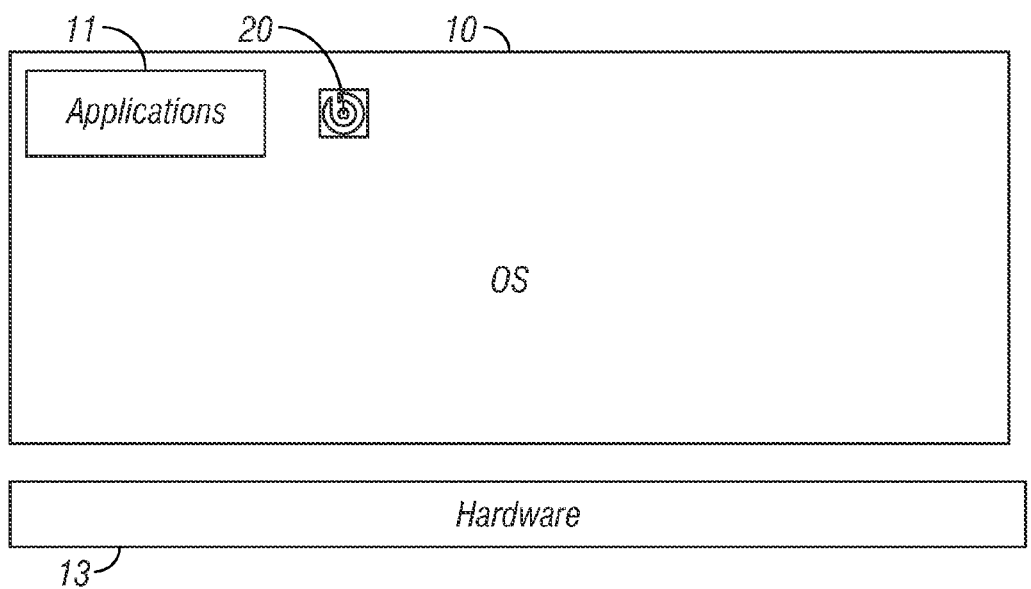
FIG. 2 is a block schematic diagram of a state of the art computer architecture that includes an agent within the operating system.
Figure 3:
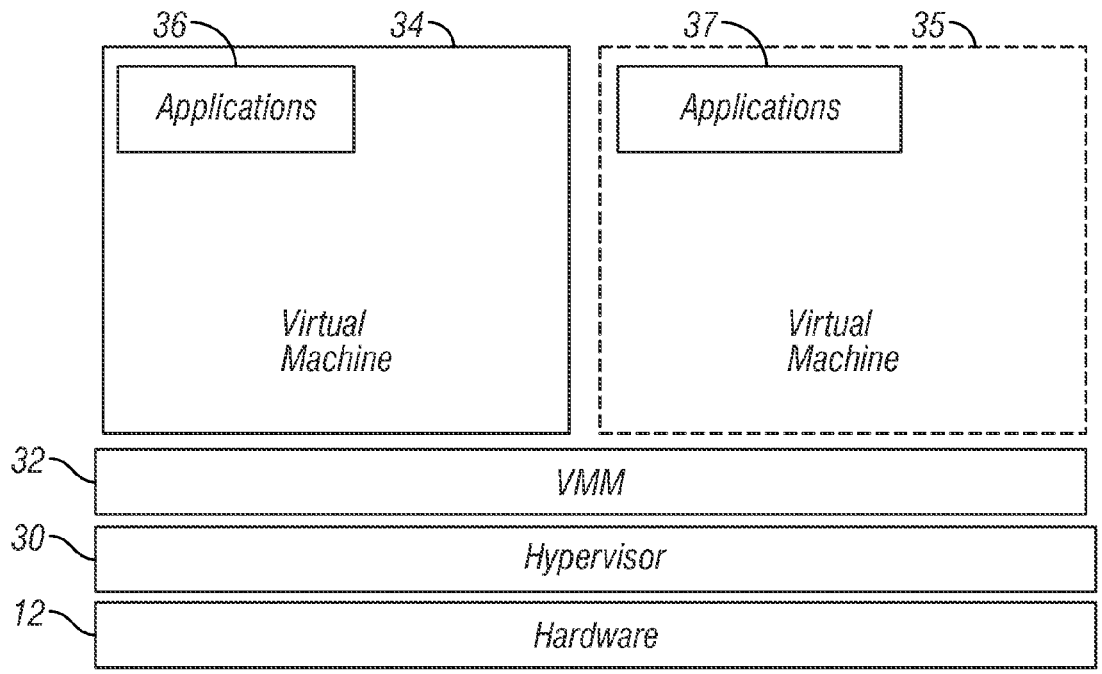
FIG. 3 is a block schematic diagram of a state of the art computer architecture that includes virtualization.

FIG. 1 is a block schematic diagram of a state of the art computer architecture, in which an operating system 10 executions various applications 11 while running on a hardware based platform 12. FIG. 2 is a block schematic diagram of a state of the art computer architecture that includes an agent 20 within the operating system. The agent is used to manage various aspects of the system, for example as implemented in a system such as the provided by BigFix, Inc. of Emeryville, Calif. FIG. 3 is a block schematic diagram of a state of the art computer architecture that includes virtualization. In FIG. 3, such virtualization provides a plurality of virtual machines 34, 35, each of which executes its own respective applications 36, 37. A virtual machine monitor 32 interfaces the virtual machines to a hypervisor 30 which, in turn, executes all system operations via the hardware platform 12. As discussed above, these state of the art approaches are limited in their ability to provide robust system management functions and features.

Figure 4:
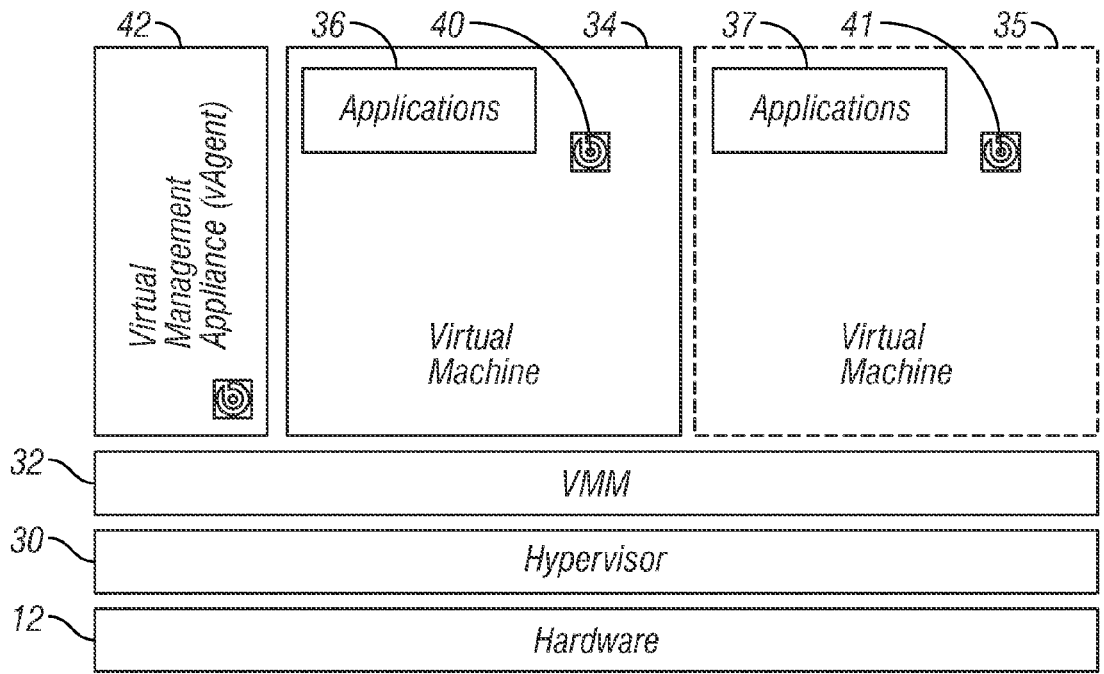
FIG. 4 is a block schematic diagram of a computer architecture that includes a vAgent according to the invention.

FIG. 4 is a block schematic diagram of a computer architecture that includes a vAgent 42 according to the invention. Hypervisors, in accordance with the embodiment of the herein disclosed invention, provide a new layer of management that is superior to the virtual machines that they run. From this layer, the virtual machines can be seen and controlled, new capabilities can be delivered, and new guarantees can be made on existing capabilities. Thus, the vAgent shown in FIG. 4 operates in conjunction with agents 40, 41 within respective virtual machines 34, 35, as further described below.

Figure 5:
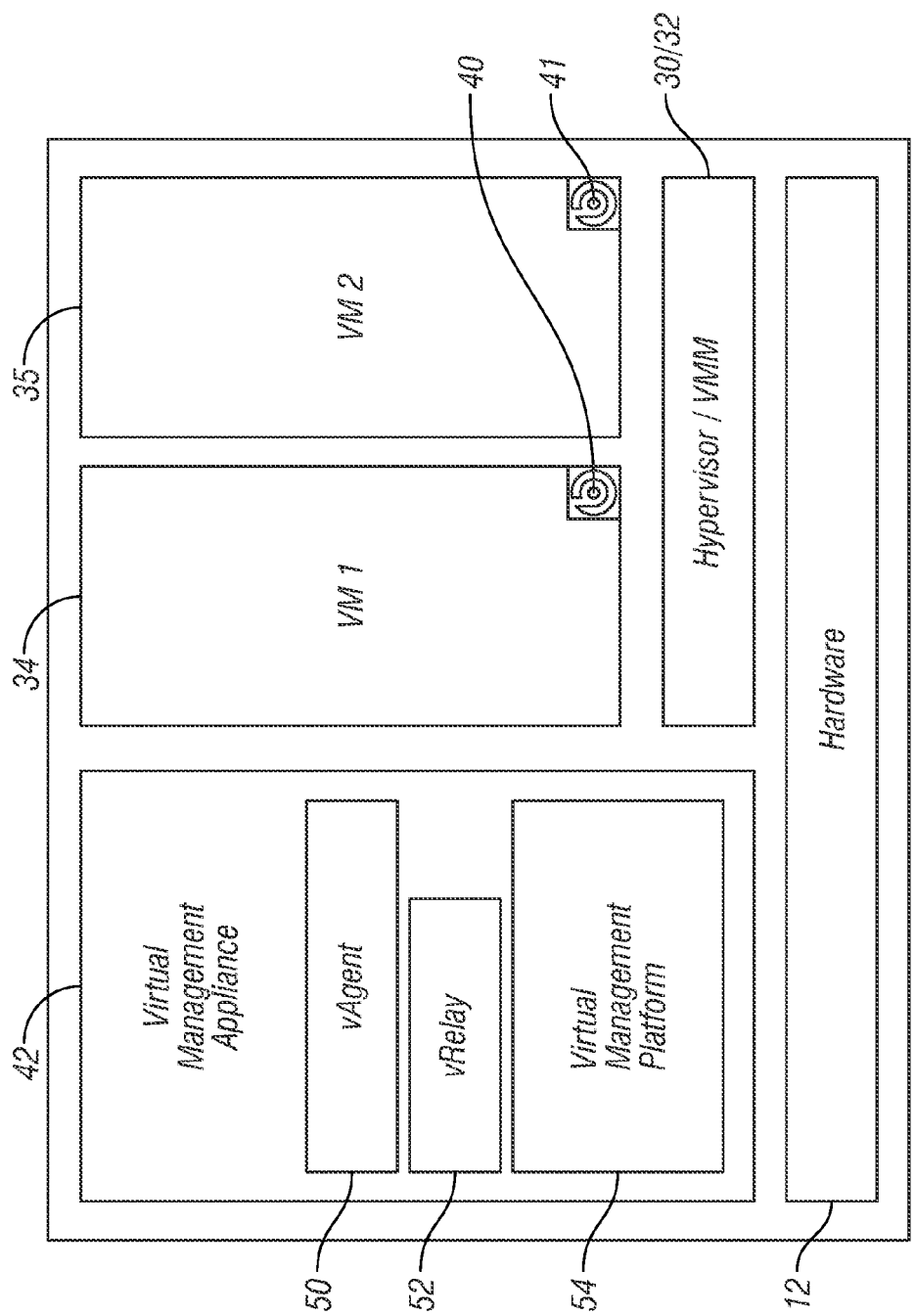
FIG. 5 is a block schematic diagram of a computer architecture showing the vAgent architecture according to the invention.

The containment hierarchy shown in FIG. 4, is shown in greater detail in FIG. 5, which is a block schematic diagram of a computer architecture showing the vAgent architecture according to the invention. In FIG. 5, the host hardware 12 runs the CHVD which, in this embodiment, comprises the Linux OS modified to include the hypervisor 30/32. The hypervisor supports an administrative environment (dom0) which includes the vServer (virtual management appliance) 42. The vServer includes the vAgent (the Administrative agent) 50, an AgentHelper (vRelay) 52, and a Notification-Forwarder (Virtual Management Platform) 54. The hypervisor also supports one or more virtual machines, e.g. VM1 34 and VM2 35, each having a respective VM agent 40, 41.

The Administrative agent in this embodiment needs network access and hard disk of approximately 100 mb to accommodate its software and data, although other embodiments may be provided with less hard disk requirements. Should a Relay also be configured to execute in the Administrative environment, additional storage to accommodate gathering, reporting, and downloads is also necessary.

Provisioning

Various embodiments contemplate any of several provisioning scenarios, which include for example:

Installing the CHVD on a Machine with an Existing Desktop OS

Transforming an existing Windows OS running on physical hardware to a virtual machine running under a CHVD on the same machine. A robust and reliable process would have these attributes:

Can be accomplished by launching a windows installer package in the running OS. The package should be compatible with a variety of newer window operating systems such as Windows XP, Windows Vista, and Windows 7.

The package should determine if the hardware and operating system meet installation requirements. By default, the installation package should refuse to run if the requirements are not met, but there should be an option to override this behavior.

Handle power failures in the middle of the operation, either requiring to start over, or to resume the operation.

The transformed system should include the Administrative environment, and the Administrative agent should be configured. This requires the placement of two configuration files next to the Administrative agent in the resulting system.

It is also important that the transformed system provide connectivity to both the Administrative agent and the encapsulated operating system without any further setup. The desired network (bridge or NAT) configuration should be specified during the installation step.

In the transformed system, several attributes available during the image capture process should be stored and later be made available to the Administrative agent context through VMPAdmin API's. These attributes are used to establish the relationship between virtual machines and the source images from which they were created:

Capture time of source image
Capture computer name of source image
Operating system of source image
Architecture of source image The following attributes should be captured at VM creation time and they should be available in the Administration agent for each virtual machine. These can also be used to track some history, distinguish the image from others:

Creation time of virtual machine
Name of virtual machine
GUID of virtual machine
Disk file path of virtual machine The following attributes should be both inspectable, as well as settable, for each virtual machine in the Administration agent and these attributes can be both get and set throughout the virtual machines lifetime:

Name of virtual machine
CPU allocation of virtual machine
RAM allocation of virtual machine
Disk allocation of virtual machine
Network adapter allocation of virtual machine
Show in boot menu of virtual machine
Boot menu entry of virtual machine
Boot menu order of virtual machine
Primary VM of virtual machine
Device access rules of virtual machine
Device pass-through attributes of virtual machine Note that any of the above items may require more than a single property value to characterize the allocated resource. In addition, the above lists are not exhaustive and various embodiments can require additional attributes.

Other attributes of the virtual machines should be available, including:

Last run time of virtual machine
Last boot time of virtual machine
Running state of virtual machine (running, paused, stopped)
Administrative agent operations:
Locate and configure deployment masthead and configuration file at startup
Boot a desktop VM Administrative Agent Modifications:
 a. On first start look in predefined locations for masthead and configuration, copy them to expected location
 b. AgentHelper command to start VM
 c. Inspectors to provide visibility into attributes listed above VMPAdmin API Functionality:
 source image attributes
  API's for accessing properties listed in source image attributes
 virtual machine attributes
  API's for accessing properties listed in virtual machine attributes
 settable virtual machine attributes
  API's to set virtual machine attributes listed in settable virtual machine attributes Installer Functionality:
 a. Installer must provide method to pass masthead and agent configuration at install
 b. Installer already contains vServer with Administrative agent contained within
 c. Installer provides the option to not boot the VM upon completion.
 d. Installer captures source image attributes as defined above.
 e. Installer captures the creation time and GUID of the virtual machine
 f. Installer allows configuration of initial values of CPU, ram, disk, network adapter allocations.

Bare Metal Provisioning of the CHVD and the Administrative Environment

There are several obstacles to deploying a bare-metal CHVD, among them:

An image format and infrastructure for deploying the CHVD either through portable media or PXE boot.

The configuration of the bare-metal CHVD image for specific deployments.

The pre/post provisioning of a VM to the bare-metal CHVD.

One CHVD is built around Linux with heavy modifications to the underlying kernel and the addition of a modified Xen hypervisor. In one embodiment, the CHVD is configured with an Administrative environment that contains a properly configured Administrative agent. This is captured in an image for the specific deployment. This allows a fully functioning CHVD to be deployed, complete with a management agent that is configured for the specific deployment.

Once deployed, the Administrative agent then provisions a VM to that CHVD. Additional steps in the bare-metal image preparation process involve including a desktop VM configured for first boot. This allows a CHVD to be delivered that already includes a desktop at the completion of bare-metal install.

Capturing a Source Image

One important part of provisioning is where a source image is captured. This requires a cross-functional tool set that maps very closely to what is currently done in OS image management. Tools are provided that can capture a running machine, reset all settings that make that particular install unique, and set it up for first boot. These attributes could be captured and move along with the source image:

Capture time of source image
Capture computer name of source image
Operating system of source image
Architecture of source image Administrative Agent Modifications:
Inspectors to access attributes of source images and virtual machines.

VMPAdmin API Functionality:
Create source image meta data and associate it with a source image Provisioning a VM Once there are captured source images and the CHVD has been deployed, it is possible to create virtual machines, and to bootstrap source images into useful operating environments.

At VM creation the following attributes should be saved:
Creation time of virtual machine
GUID of virtual machine
Disk file path of virtual machine At VM creation, and subsequently, the following attributes are configurable:
Name of virtual machine
CPU allocation of virtual machine
RAM allocation of virtual machine
Disk allocation of virtual machine
Network adapter allocation of virtual machine
Device access rules of virtual machine
Device pass-through attributes of virtual machine These VM attributes are automatically kept up to date by management operations:
Last run time of virtual machine
Last boot time of virtual machine
Running state of virtual machine (running, paused, stopped)

A boot menu is needed for the end user to select a machine other than what is currently set as the primary VM. VMs can be optionally added to the boot menu by the operator at provisioning time and subsequently by configuration. The boot menu is accessed by a keystroke at machine start. The notion of the primary VM is also configurable at provisioning time, the primary VM always boots unless there is user interaction through the boot menu. When there is no primary VM designated, or multiple primary VMs are designated, the boot menu is always shown.

At VM creation, and subsequently, the following attributes would configure the boot menu:
Show in boot menu of virtual machine
Boot menu entry of virtual machine
Boot menu order of virtual machine
Primary VM of virtual machine As with provisioning by transforming an existing operating system, attributes of the captured image, as well as the virtual machine creation attributes, should be available from within the Administrative agent by way of the VMPAdmin API.

Administrative Agent Operations:
AgentHelper command to download a source image and metadata from repository
AgentHelper command to create a VM container given a set of physical resources, configuration parameters
AgentHelper command to configure boot sequence for PXE/CDROM/ISO image source install of OS
AgentHelper commands to configure hardware characteristics of VM
AgentHelper commands to configure VM for boot and boot menu entry
AgentHelper commands to start/stop/pause VM Administrative Agent Modifications:
Inspectors to enumerate list of VMs
Inspectors to enumerate external meta data of virtual machines Agent Operations:
Ability to detect the unique virtual machine identifier Agent Modifications:
Inspector to expose GUID of virtual machine VMPAdmin API Functionality:
Virtual Machine operations from the Administrative agent
Create a VM container.
Configure VM resource and device rules and device pass-through (see device provisioning)
Configure VM boot order
Specify CDROM/ISO/boot image file for mounting to VM
Start/Stop/Pause VM.
Remove VM.
Virtual machine enumeration
API's to enumerate list of VMs.
Virtual machine attributes
APIs to access external properties of VMs.

Network Configuration

There are two primary modes of network configurations: Bridged Mode and NAT Mode.

Figure 6:
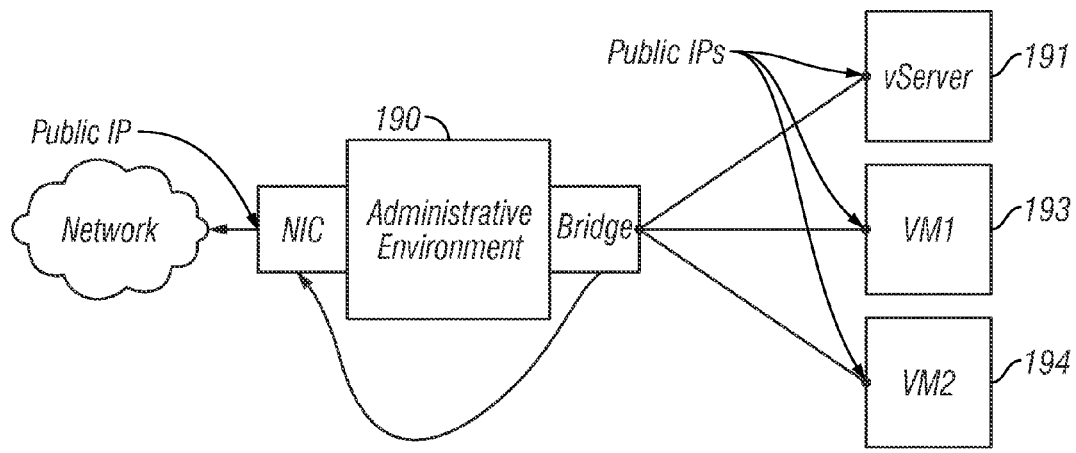
FIG. 6 is a block schematic diagram of a computer architecture showing a bridged mode network configuration according to the invention.
Figure 7:
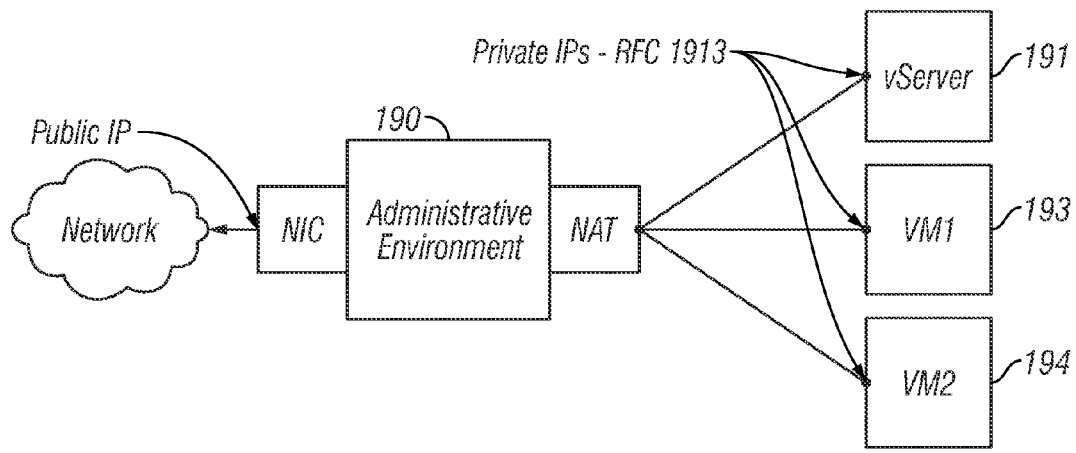
FIG. 7 is a block schematic diagram of a computer architecture showing a NAT mode network configuration according to the invention.

FIG. 6 is a block schematic diagram of a computer architecture showing a bridged mode network configuration according to the invention; and FIG. 7 is a block schematic diagram of a computer architecture showing a NAT mode network configuration according to the invention.

In Bridged mode, the Host OS, the Administrative agent 191, and each VM 193, 194 receive publically addressable IP addresses. This allows the administrative environment 190 to avoid heavy modification to the current Agent/Relay infrastructure. However, this requires that three publically addressable IP's are assigned to each physical machine. This may or may not be acceptable in existing environments, where IP address space is in short supply. If the Administrative agent were to run in the host OS, this would be reduced to two IP addresses. For each additional concurrent VM, one more IP would be necessary.

In NAT mode, only the host OS is assigned a publically addressable IP, the Administrative agent and each VM receive NAT IP addresses. In this mode, all deployment port traffic is routed by configuration of a port forwarding rule in the host OS that would direct traffic entering the machine on the deployment port to the Administrative agents NAT address. A notification forwarder is running that forwards notifications to particular agents by their NAT addresses. In this configuration all agents running on the physical machine use a modified registration process to allow the Administrative agent to select the parent relay for them, and for notifications to be forwarded to them.

Administrative Agent Operations:
    Relay selection thru local NotificationForwarder
    Ability to switch network modes to and from NAT and bridge Administrative Agent Modifications:
    Inspectors for all items are discussed below in connection with Relay selection.
    Adjust relay selection and registration logic per the discussion below in connection with Relay selection
    AgentHelper command to set desired network mode NotificationForwarder Operations:
    Facilitate modified registration interaction
    Keep track of client registration list (computer id, IP address)
    Listen for TCP commands on deployment port, forward as UDP based on computer id.

VM Agent Operations:
    Relay selection thru local NotificationForwarder
    Technique to gather, report, download from parent relay configured by Administrative agent VM Agent Modifications:
    Inspectors for all items listed in the discussion below in connection with Relay selection.
    Adjust relay selection and registration logic in the discussion below in connection with Relay selection
    Adjust gathering, reporting, downloading to be able to come directly from parent relay, bypassing the NotificationForwarder for these communications.

VMPAdmin API Functionality:
    Relay selection
        API's for all items listed in the discussion below in connection with Relay selection
    Set network mode
        API to set desired network mode
    Set VM Agent Communications Configuration
        API's to set VM agent IP address to register through and parent relay to gather, report, and download from because it bypasses the forwarder for these communications and communicates directly with the parent relay selected by the Administrative agent.

VMPGuest API Functionality:
    Relay selection
        API's for all items listed in the discussion below in connection with Relay selection
    Get VM Agent Communications Configuration
        API to collect communications configuration (parent relay to gather, report, download from).

Hardware Device Configuration

Hypervisors provide various ways to abstract physical devices from virtual machines. These devices can be abstracted in the following three ways.

Pass-through—a technique in which the actual hardware is presented to a single virtual machine, and other virtual machines do not see the hardware. This enables device specific optimizations to take place between the driver running in the virtual machine and the hardware.

Emulation—a software emulation of a device is performed by the hypervisor, and the virtual machines interact with the device as if it was a real hardware device. This is the simplest form of implementing an I/O device on a hypervisor, but it is also the least efficient due to the additional software layer required to access the physical device.

Para-virtualized—more efficient than emulation, this method creates a virtual I/O device where software running inside the virtual machine is aware of the fact that it is running on a hypervisor. The virtual machine drivers are aware of special operations that can be performed with the underlying virtual machine in order to improve performance.

Some embodiments achieve benefits by creating virtual machines where most devices are configured for emulation or para-virtualization. Depending on the abilities of the hypervisor, this increases the likelihood that the same source image can be provisioned to run on a variety of hardware.

In situations where the resulting performance is insufficient, or where the hypervisor does not support the underlying device, the hypervisor can be configured to provide pass-through for the device.

Administrative Agent Operations:
    Ability to inspect physical hardware devices such as manufacture, model, device type
    Ability to inspect configured pass-through attributes each device of each VM
    AgentHelper command to specify pass-through attribute of a device on a VM
    AgentHelper command to attach/detach device to VM Administrative Agent Modifications:
    Inspectors for physical hardware of machine
    Inspectors for pass-through attributes of devices of VMs Agent Operations:
    For the class of situations where the OS can facilitate install of the driver:
    Administrative agent would:
        1. Configure appropriate device for pass-through to VM.
    VM agent would:
        1. Download driver
        2. Changes OS to look for driver in known location.
        3. Pause until appropriate device is configured for pass-through.
        4. Restart the VM (not the machine).

VMPAdmin API Functionality:
    peripheral device characteristics
        Functions to enumerate external properties of machine
    configured device attributes
        Functions to get configured device attributes
    settable virtual machine device attributes
        Functions to set device attributes
    Attach/Detach device to VM
        Functions to attach/detach device to VM
    VMPAdmin—VMPGuest communications
    Query mechanisms between VMPGuest and VMPAdmin VMPGuest API Functionality:
    Get device pass-through configuration
        Function to query device pass-through configuration given device Removable Device Management Removable device management is defined here as the ability to configure the hypervisor to control which VMs may have access to removable devices, such as USB, SD/MMC/CF, CDROM, DVD, PCMCIA/ExpressCard, and wireless cards. This provides security from outside the operating image, providing a device control mechanism that the virtual machine cannot bypass from within its context.

The hypervisor is configured by the Administrative agent using VMPAdmin API functions to specify what should happen when devices are inserted. Once configured, the hypervisor can deny access, allow access, and delegate the access decision to the end user. The configuration should specify the behavior:

For each virtual machine
For each device type (USB, SD, PCMCIA, etc.)
By characteristics of the device or media being inserted into the machine, such as the device manufacturer, media serial number, and or media mount label The configuration should specify these kinds of configuration rules:

Disable USB for all virtual machines
Disable USB to the primary and emergency partition, unless the device inserted into the USB is manufactured by 'company-x' or within a specified serial number range
Only allow access to the PCMCIA device to the virtual machine named 'x'
Disable wireless access to all virtual machines
Allow the end user to specify which running virtual machine should be granted access to the USB when it is inserted The configuration is used by the hypervisor when it detects the insertion of the device. It enforces the configuration by processing the rules for each virtual machine.

A set of access rules is specified for each VM. The access rules include the ability to specify the device type to which the rule applies, as well as the desired access operation performed. The rules should be processed and rules matching in the type of device should be considered. If no rule is found that matches the type of device, access should be allowed. Thus, an empty access rule set for a virtual machine allows access to any device by the virtual machine. In situations where the access rules prove ambiguous, a tie-breaking rule is applied and the device is assigned to the first virtual machine that satisfied the rules. One formatting of a particular virtual machines device configuration file comprises a line oriented comma delimited file each line containing a device access rule of the form:

rule, <type_of_device>, <access>, <matching_rule> where <type_of_device> is one of:
USB
PCMCIA
express
CDROM
wireless where <access> is one of:
allow
allow-read only
deny
user-choice where <matching_rule> is optional or one of:
manufacturer=<name>
serial_number_range=<low>,<hi>
label=<label>

There are other properties of devices and device media for which matching rules can be specified.

Inspectors used as part of the management architecture, such as provided by BigFix of Emeryville, Calif., align with these names if possible:

types of removable devices of <virtual machine>—strings
USB, PCMCIA, express, CDROM, wireless mounted of removable devices of <virtual machine>—Boolean
access rules of removable devices of <virtual machine>—strings formatted as described above
manufacturer of mounted removable devices of <virtual machine>
serial number of mounted removable devices of <virtual machine>
label of mounted removable devices of <virtual machine>

With the above inspectors, a serialization of all the access rules can be built using relevance.

Administrative agent operations:
enumerate device policy access rules for every VM
AgentHelper command to set device policy rules for VM from a file
AgentHelper command to save device policy rules for VM to a file Administrative Agent Modifications:
Inspectors that can enumerate device policy access rules for VM VMPAdmin API Functionality:
Configured device attributes
  a. Functions to expose the information listed as inspectors above.
Settable Virtual machine attributes
  a. Functions to set device policy access rules for a VM from a file or memory Relay There are situations where it is desirable to deploy a Linux relay in a virtual machine, or in the vServer. This can facilitate a better licensing model for situations where Microsoft requires server class licenses on desktop machines where their operating system is facilitating communications.

A few special considerations should be made when a relay is to be deployed:

VM responsiveness
  The relays resource usage may reduce the desktop VM's performance where it is unusable or unresponsive.
If the relay is deployed in a vServer
  In NAT mode
    NotificationForwarder should be disabled
    port forwarding rule should be put in place to relay
    relay can be advertised in relays.dat with external IP address
  In Bridge mode
    NotificationForwarder should be disabled
    Port forwarding rule should be removed
    Relay can be advertised in relays.dat with external IP address
If the relay is deployed to a VM
  In NAT mode
    This allows deployment of a windows relay to the virtual machine.
    In one embodiment, the Administrative agent and the VM agents behave as if the relay were not there.
    Should a relay find itself running in a VM in NAT mode it can
      Log a message and refuse to run in this mode.
      A VM agent running in this context should ignore the relay in the VM with it.
  In Bridge mode
    NotificationForwarder should be disabled
    port forwarding rule should be removed
    Relay can be advertised in relays.dat with external IP address Other than the above considerations, a relay can behave in all other respects as a normal relay.

VMP Functionality:
　Relay selection
　Set network mode
　Get VM Agent Communications Configuration
　Set VM Agent Communications Configuration
Snapshot/Rollback In the context of system administration, snapshot/rollback are useful to restore a machine to a useable state. It would be best if this function could preserve end user data, but this requires separation of system state from user data, a difficult problem (see the 'data drive' use case for one approach to mitigating this problem). In situations where loss of user data is mitigated or acceptable, this is still a useful capability.

Hypervisors provide the ability to create snapshots of virtual machine images, and to rollback a virtual machine to a snapshot. The snapshot operation can come in a variety forms. Among them:
　Take a snapshot while the VM is running
　Pause a VM, then take a snapshot, then resume the VM
　Take a snapshot of a stopped VM
　Take a snapshot while the VM is running—If it is possible to snapshot a running image without disturbing the end-user, it is conceivable to periodically take snapshots in preparation for subsequent failure. This could be performed by the Administrative agent on a periodic basis, without any knowledge of the timing of changes taking place within the virtual machine. It is also of value for the agent to have an ability to trigger a snapshot of the virtual machine in which it is running, as it might do when it is about to run an action.

Should this operation be too disruptive to occur at arbitrary times, it is still possible to take the snapshot during certain states of the virtual machine when it is unlikely or impossible for the operation to impact the end user as when a virtual machine has no user logged in, or a screen saver is running.

For the hypervisor to support this form of snapshot, the following operations are necessary:
　From the VM agent—Send a message from inside the virtual machine that requests that a snapshot be taken. Be able to tell that the operation has completed.
　From the Administrative agent—Trigger a snapshot.
　From the Administrative agent—Detect that a virtual machine is in particular states, such that the screen saver is running, or that no user is logged in.
　Provide the ability to have the Administrative agent cause a user interface to be presented to the end-users desktop to coordinate when the snapshot should begin and to give a progress indication. The user interface might allow the user to cancel the operation, or approve it.
　While the snapshot is in progress, we would require that a status message be displayed on the desktop indicating that a snapshot is being taken, with a progress indicator.

Pause a VM, then take a snapshot, then resume the VM—If this operation is possible, we have logic in the Administrative agent that triggers when a snapshot should occur. We need the same set of operations as identified above. The snapshot progress indications would be shown even when the virtual machine is not running.

Take a snapshot of a stopped VM—It might still be of some value to only be able to take a snapshot when the virtual machine is in a stopped state. However, the machine may seldom get stopped, and it would be necessary to notice that a snapshot it overdue, and to trigger a shutdown/snapshot/startup operation, with timing considerations provided to the end-user and operations available as described above.

In addition to the above operations, management of snapshots is important and requires these additional operations be provided to the Administrative agent:

Enumerate snapshots, for each snapshot provide:
　　Virtual machine name of source
　　Date and time snapshot was taken
　　Size of snapshot
　　ID of snapshot
　Delete a snapshot by ID.
　Rollback an image to a particular snapshot ID.
　In situations where virtual machine does not start, provide an operation to show the end user a list of available snapshots, let him choose, and then start or resume the particular snapshot.
　In a scenario where a virus has corrupted a machine, it is desirable to restore to a particular snapshot, and then boot the image in a fashion such that only the system communications port is open to http traffic. If this can be achieved, the rollback can be followed by management operations in the agent running inside the VM to mitigate likelihood of subsequent infection. This is comparable to offline patching. We need these capabilities:
　　Resume or start a rollback image with limited network access (list of ports where traffic is allowed).
　　Mechanism software running inside a particular virtual machine can use to indicate that the network port block can be removed.
Persistence Mode Persistence mode is to be used when the Virtual Machine is expected to revert to its original state at every reboot. The Hypervisor achieves this by configuring the Virtual Machine to not write any changes to disk during operation. All changes are discarded on restart or shutdown. Virtual Machine persistence mode can implement the following functions:
　Function to get current persistence mode of VM given image path
　Function to set virtual machine to ignore all changes when it is restarted
　Function to set virtual machine to accept all changes as it is running
　Boot menu functionality
Administrative Agent Operations:
　Set the VMs persistence state
　Enumerate the VMs and detect their persistence property
　Launch an application that can wait for the VM to transition to a shut down state and change the VM state back to non-persistent
Administrative Agent Modifications:
　Inspectors to enumerate VMs persistence property
　Create a AgentHelper command to set persistence property of a VM
　Create a AgentHelper command to poll for VM shutdown state and return VM to persistent state
Agent Operations:
　detect it is running in a non-persistent VM
　be configurable to serialize it's state into persistent storage
　shutdown VM when no pending actions and no restart pending state is detected
Agent Modifications:
　Create an inspector to expose the persistence state of a VM
　Configure the agent to serialize its configuration in a flat file/database outside of the registry similar to the function of the *nix agents. Also, configure the agent to store its content and data files in a writable location
　The agent should process all pending actions, as well as all pending restarts and, when these have been exhausted, shutdown.
VMPAdmin API Functionality:
　Virtual machine enumeration
　Data drive functions Functions to persist data even when Data drive is mounted by a VM running in non-persistent mode.
Virtual Machine persistence mode
Function to get current persistence mode of VM given image path.
Function to set virtual machine to persistent or non-persistent mode.

Emergency VM

Figure 8:
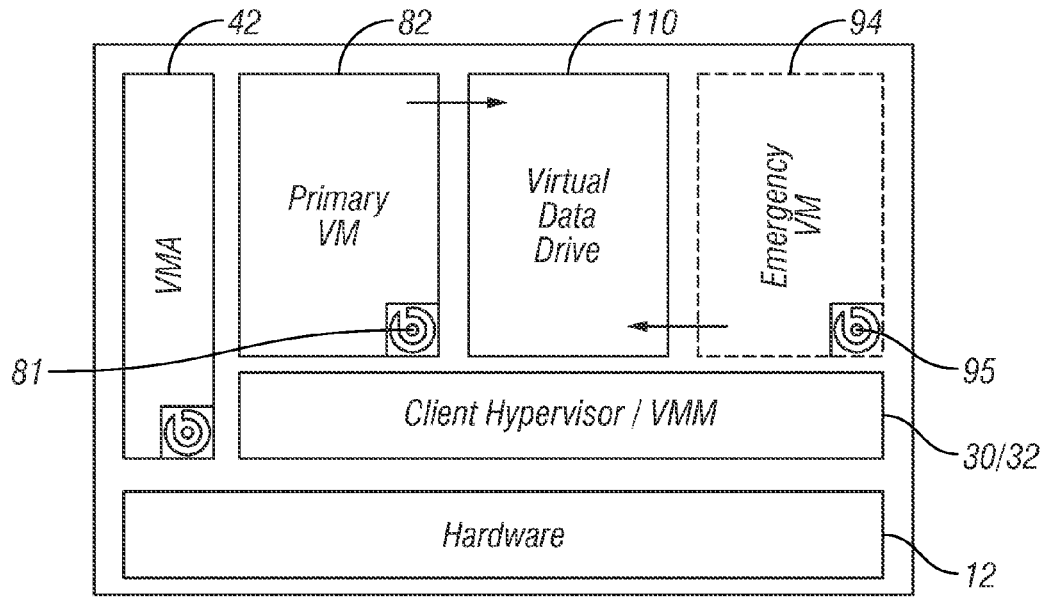
FIG. 8 is a block schematic diagram of a computer architecture showing an emergency VM via the vAgent architecture according to the invention.

FIG. 8 is a block schematic diagram of a computer architecture showing an emergency VM 94 via the vAgent architecture according to the invention. The emergency VM:
  Allows user access to computer if primary VM is corrupted/infected/etc.
  Emulated hardware for ease-of-management/ease-of-deployment
  Optional "Revert on Restart"

Figure 9A:
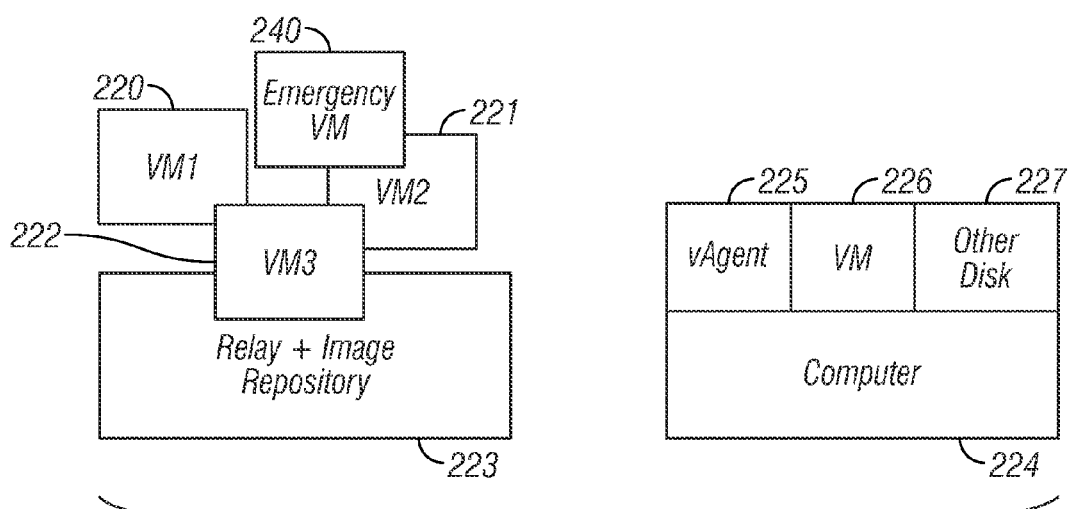
FIGS. 9a and 9b are block schematic diagrams of a computer architecture showing an emergency VM according to the invention.
Figure 9B:
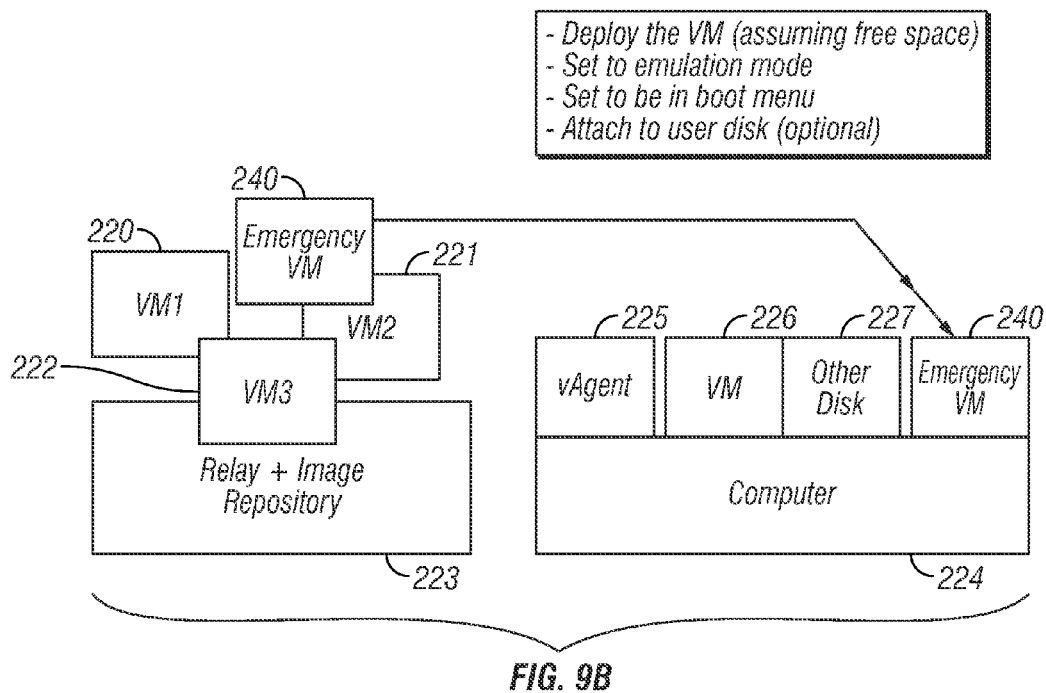

FIGS. 9a and 9b are block schematic diagrams of a computer architecture showing an emergency VM according to the invention. The emergency VM 240 provides another VM that can be booted if the primary VM fails. An emergency partition is some predefined image that provides basic functionality. When the primary desktop image fails to boot, it is helpful to let the end user choose to boot to the emergency partition.

The partition might be considered an appliance, complete with OS, web browser, and limited set of tools needed until the primary partition can be repaired or replaced. The OS might be Linux, it might be Windows, or it might be an virtual machine comparable to a thin-client, where it would hook to a remote desktop that contains a useful emergency functionality.

Optionally, it would be useful if the emergency partition had the property that when it was shutdown, any changes that had been made to it while it was running would be forgotten, see Persistence mode discussed above.
  Operations include:
  Provision emergency partition as in provisioning above
  End user is able to select emergency partition from a boot menu when triggered by keystroke at boot time
  The emergency partition is identifiable by some naming convention in the boot menu entry.

End-of-Life

Figure 10:
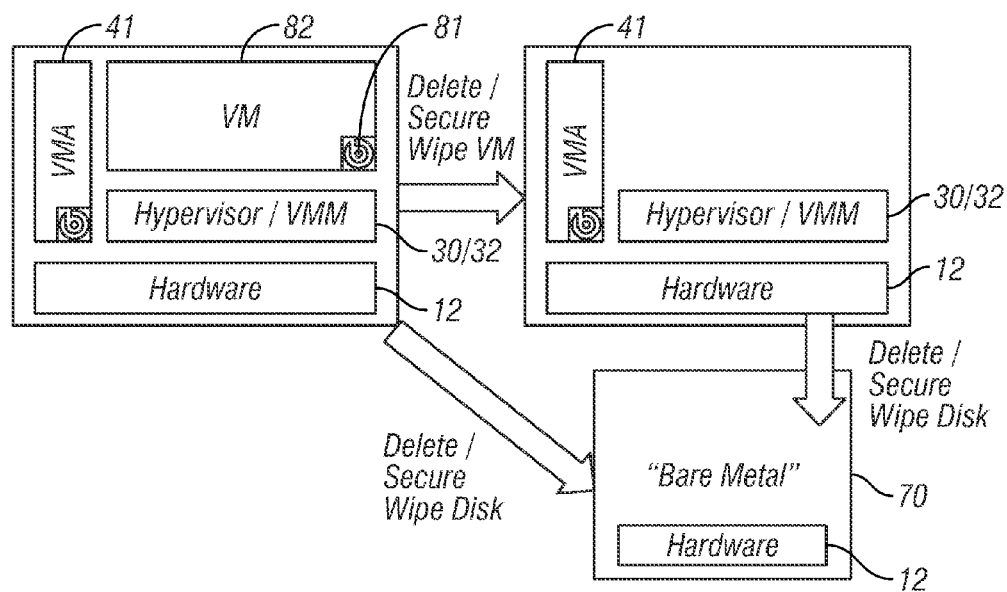
FIG. 10 is a block schematic diagram of a computer architecture showing end of life options via the vAgent architecture according to the invention.

FIG. 10 is a block schematic diagram of a computer architecture showing end of life options via the vAgent architecture according to the invention. When a machine is being decommissioned from use, it is likely that processing the machine yields some valuable effects, especially the removal of data. Removal comes in two types: one in which the desktop images are deleted, the other where the entire disk is cleared.

Administrative Agent Operations:
  Enumerate virtual machines
  AgentHelper command to delete the bytes of a virtual machine with optional secure wipe.
  AgentHelper command to delete all bytes from physical disk with optional secure wipe
Administrative Agent Modifications:
  Inspectors to enumerate virtual machines
VMPAdmin API Functionality:
  Virtual machine enumeration
    API's to enumerate list of VMs.
  Image management operations/Delete a virtual machine
    Function to delete bytes of a virtual machine with optional secure wipe
  Delete entire contents of physical disk (Delete Physical)
    Function to delete all bytes from physical disk with optional secure wipe.

Figure 11:
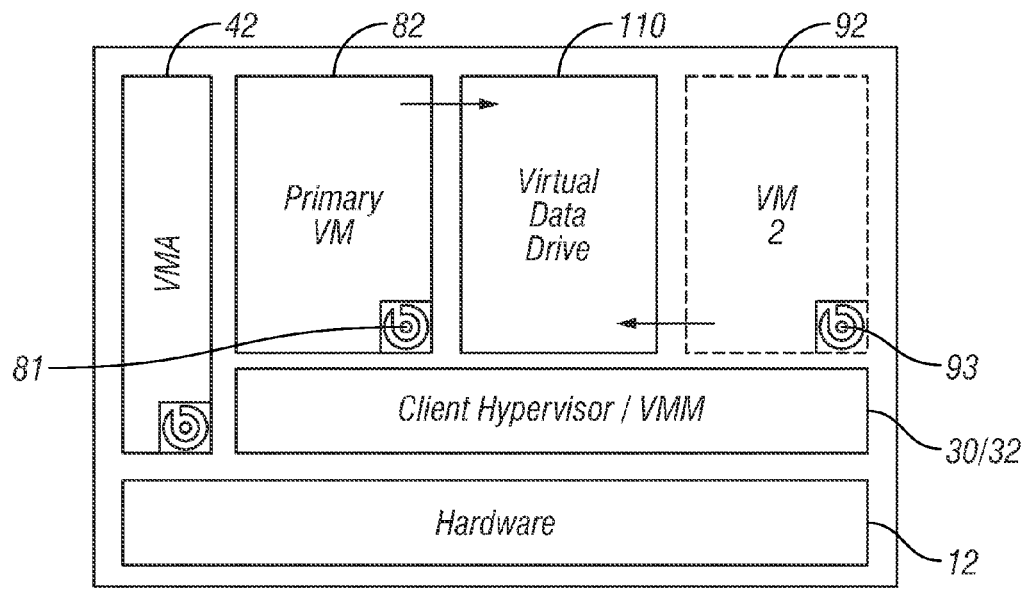
FIG. 11 is a block schematic diagram of a computer architecture showing a virtual data drive via the vAgent architecture according to the invention.

EOLing a VM is a useful function. The EOL process in an embodiment includes the following steps:
  vAgent stops the VM
  vAgent mounts the VM disk
  vAgent runs a Linux tool to wipe the bytes from VM disk
  vAgent removes the VM and deletes the disk Data Drive FIG. 11 is a block schematic diagram of a computer architecture showing a virtual data drive 110 via the vAgent architecture according to the invention. A data drive is useful as a mechanism that separates specific data from the VM. It can also be used to share data between VMs, store user and/or application data, and can be backed up, copied, or moved as a convenient container. It can also be used to mount another virtual machine as a file system to collect files left on another virtual machine.

Various embodiments of the invention supports all of these applications by exposing the data drive as an SMB, NTFS, or network share to the VMs. Each data drive has any of the following properties:
  Creation date
  File system type
  Size
  Used Size
  Path
  Share name
  date last modified
  date last mounted
  mount status
    currently mounted,
    names of VMs in which it is currently mounted,
    names of VMs in which it is configured to be mounted
Administrative Agent Operations:
  Enumerate existing set of data drives and their properties as listed above
  Create a data drive
  Configure a VM to mount/unmount a data drive at boot
  Delete a data drive
  Mount/unmount drive for file operations
Administrative Agent Modifications:
  Inspectors to enumerate and expose data drive properties
  AgentHelper command to create a data drive given specifications
  AgentHelper command to configure VM to mount/unmount data drive
  AgentHelper command to delete a data drive
  AgentHelper command to mount/unmount drive in a local context
VMPAdmin API Functionality:
  Data drive functions
    Enumerate existing data drives and their properties
    Create a data drive given size, file system type, path, and data drive name
    Configure a data drive for mount/unmount on boot given a VM name and data drive name
    Delete a data drive given a path and data drive name
    Provide the ability to mount/unmount drive in a Administrative environment while also mounted in VM
Variations:
Virtual Data Drive:
  "Local Share" of user data
  Data maintained outside of VMs
  Data accessible by multiple VMs
  Allows for ease of management, backup, deployment, migration, etc.

Figure 12:
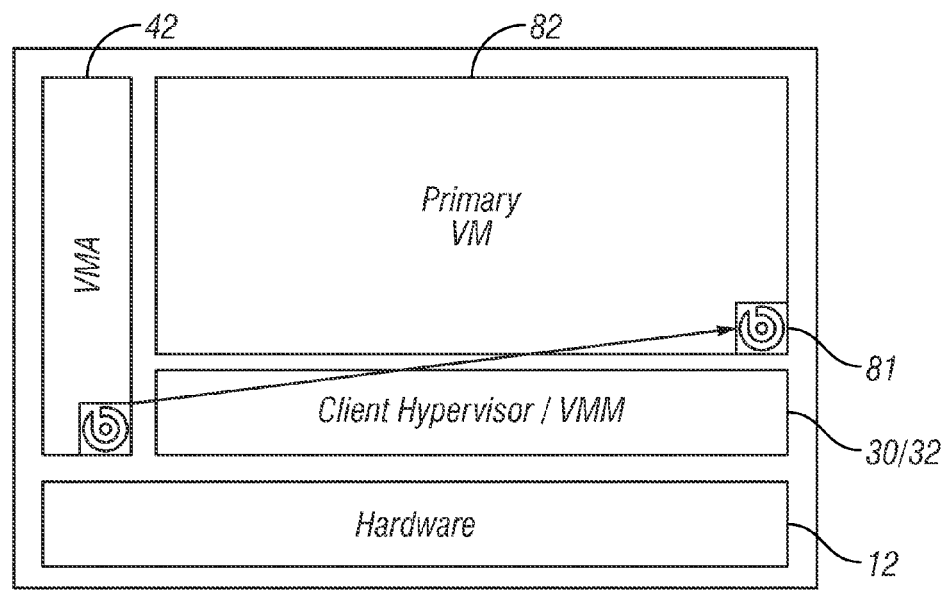
FIG. 12 is a block schematic diagram of a computer architecture showing a protected agent via the vAgent architecture according to the invention.

User Data Drive:
  A User Data drive is a concept where we store specific user information separate from the VM
  This allows us to make user data portable between VMs and even machines
  This allows the IT organization to effectively change operating systems/VMs without the expensive migration step
  The Agent can help change key operating system paths to help enable this
User Data Drive Steps:
  vAgent provisions a separate disk
  vAgent attaches disk to VM
  VM Agent identifies and reassigns key directories/registry keys to separate User
Protected Process FIG. 12 is a block schematic diagram of a computer architecture showing a protected agent via the vAgent architecture according to the invention. Companies often want to ensure control of their systems and protect them against tampering. This is a difficult task when the users are administrators and have full control of their computers. The Agent allows customers to gain control of their computers but administrators can disable the Agent. Hypervisors allow an opportunity with a layer beneath the OS that can be used to enforce that the Agent (or other processes) are protected.

For example, one might want to detect that the "Corporate Desktop" running virtual machine is running a process named "BESClient.exe" and that this process has a resource string named "Company" whose value is "BigFix, Inc."

Administrative Agent Operations:
  Inspect the process table of a running VM for a process by name and resource file attribute.
  When directed, compute the sha1 hash of a named process in a VM
  AgentHelper command to display a message in the running VM.
  AgentHelper command to reconfigure network to specified configuration to limit access and to restore access.
  AgentHelper command to disable and restore access to devices.
VMPAdmin API Functionality:
  Virtual Machine process enumeration
    Given a running virtual machine image path, functions traverse the process table, returning:
      Process id, process name, process full path
      Function to lookup a named resource in a file, given its full path and the name of the resource name.
  Virtual Machine file attributes
    Functions to compute sha1 of a file given its full path.
    Function to compute size of a file given its full path
  Virtual Machine user message display and response
    Functions to display a message to a running VM.
    Function to get response user gave to message box.
  Virtual Machine network isolation
    Functions to set network configuration from a file
    Functions to get network configuration to a file.
  Virtual Machine disable device
    Functions to enable and disable access to devices.

Figure 13:
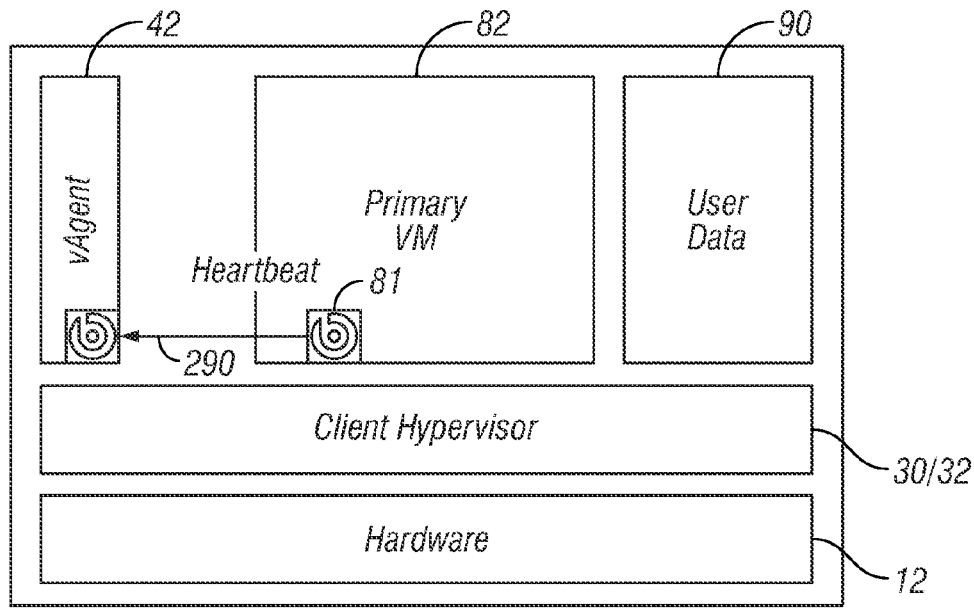
FIG. 13 is a block schematic diagram of a computer architecture showing a heartbeat for a protected agent according to the invention.

With the protected agent, the vAgent 42 can look inside the VMs 82 to ensure that the Agent 81 is running. If the Agent is not running, the vAgent has various options:
  Report violation to server
  Pop message to VM user
  Restrict network access
  Stop/pause VM
  Install/Start Agent FIG. 13 is a block schematic diagram of a computer architecture showing a heartbeat for a protected agent according to the invention. The protected agent allows the vAgent to monitor the Agents inside the VMs. In this embodiment, the vAgent (or helper app) listens on an event channel. The Agent in OS repeatedly sends a heartbeat message 290 on the event channel. If the vAgent does not see heartbeat message for X time period, a Fixlet (see BigFix of Emeryville, Calif.) becomes relevant that indicates that OS Agent is not working.

If the vAgent notices that no agent is running in VM, possible remediation options include mounting a CD/USB drive to start or install agent, stopping the VM, and cutting off network access.

Offline Patching/Configuration Management

Some virtual machines are rarely started or run. As a result, they become more and more out of date, and therefore more and more vulnerable to known exploits. In this situation, as with Persistence mode (discussed above), the virtual machines can be brought up to date by periodically starting the image, allowing the embedded agent to apply any pent up policy actions, and then shutting the virtual machine down. This should enable the virus and spyware definitions to be brought up to date, as well as apply any patches or changes in configuration as specified by the system management deployment.

Starting an image that is not fully up to date exposes the system to exploits until it is updated. To reduce the likelihood that this occurs, it is desirable to bring up the image with only agent communications enabled. This can be accomplished by disabling all socket traffic except for the system management deployment port.

Administrative Agent Operations:
  Configure the network to only allow egress/ingress traffic on the deployment port to the VM
  Boot the VM
Administrative Agent Modifications:
  AgentHelper command to capture current network configuration of a VM to a file
  AgentHelper command to limit and restore VM networking configuration.
Agent Operations:
  Run all relevant actions and restarts then shutdown
Agent Modifications:
  As in Persistence mode, agent needs to transition back to a shutdown state when all actions and restarts are completed
VMPAdmin API Functionality:
  Virtual machine limit and restore network
  Virtual machine disable and enable device As with Persistence mode, offline patching when an end user is unaware that this is occurring, can lead to problematic situations. The end user can decide to power off the machine, or decide he wants to use the image that is being patched. In a server hosted virtual world, the server is never powered off, at least conceptually. It is therefore a safe operation to patch an image in an offline state. A solution that deals with all these complications would:
  Preserve the last good state of the virtual machine so they are always available to be started by the end user.
  Not impact the end user by taking resources from his machine of choice.
  Notify the user that offline patching is taking place.
  Insulate the end user from device allocation conflicts.

FIGS. 14-17 are a series of block schematic diagrams of a computer architecture showing offline patching and configuration management via the vAgent architecture according to the invention. In FIGS. 14-17, VM states 130 are shown by stop 131, pause 132, and play buttons 133.

Figure 14:
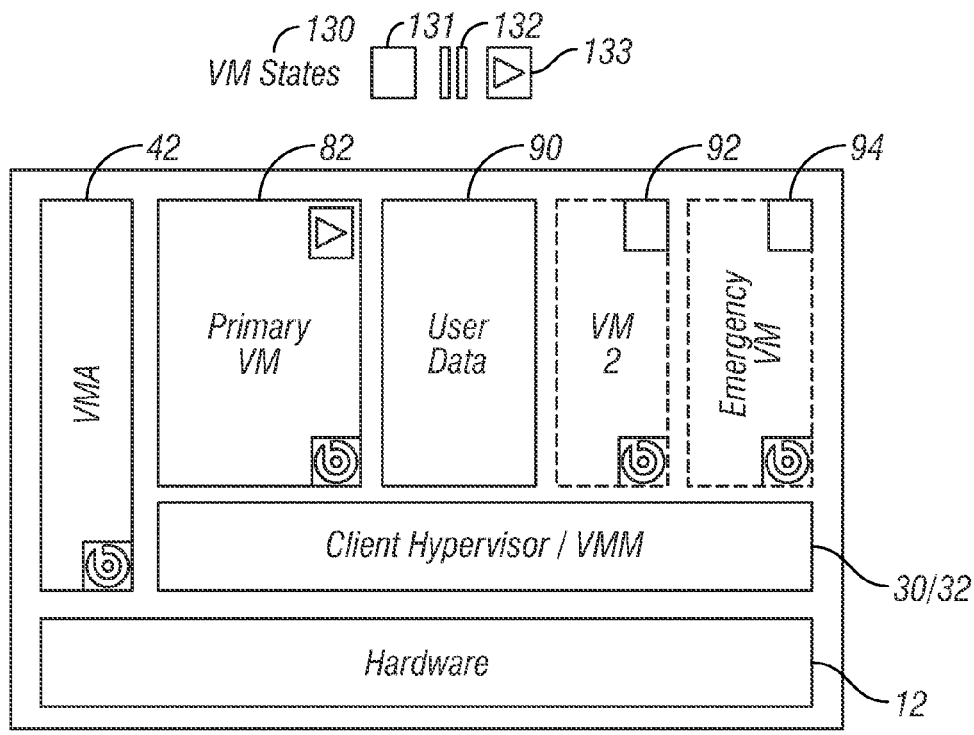
FIG. 14 is a block schematic diagram of a computer architecture showing offline patching and configuration management via the vAgent architecture according to the invention.
Figure 15:
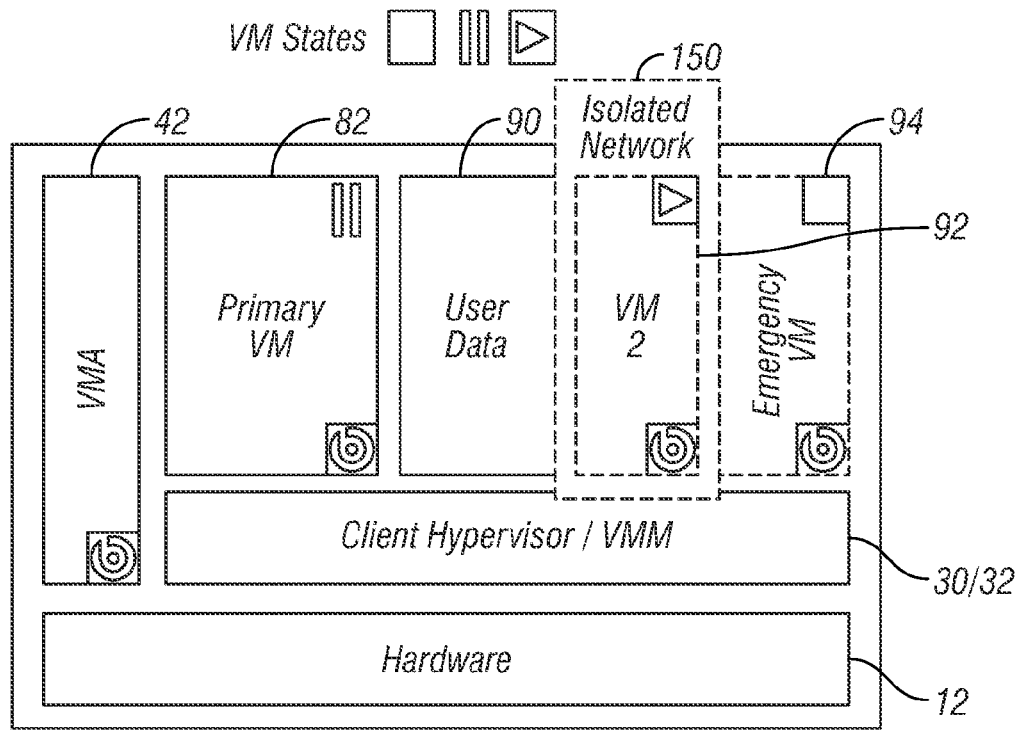
FIG. 15 is a second block schematic diagram of a computer architecture showing offline patching and configuration management via the vAgent architecture according to the invention.
Figure 16:
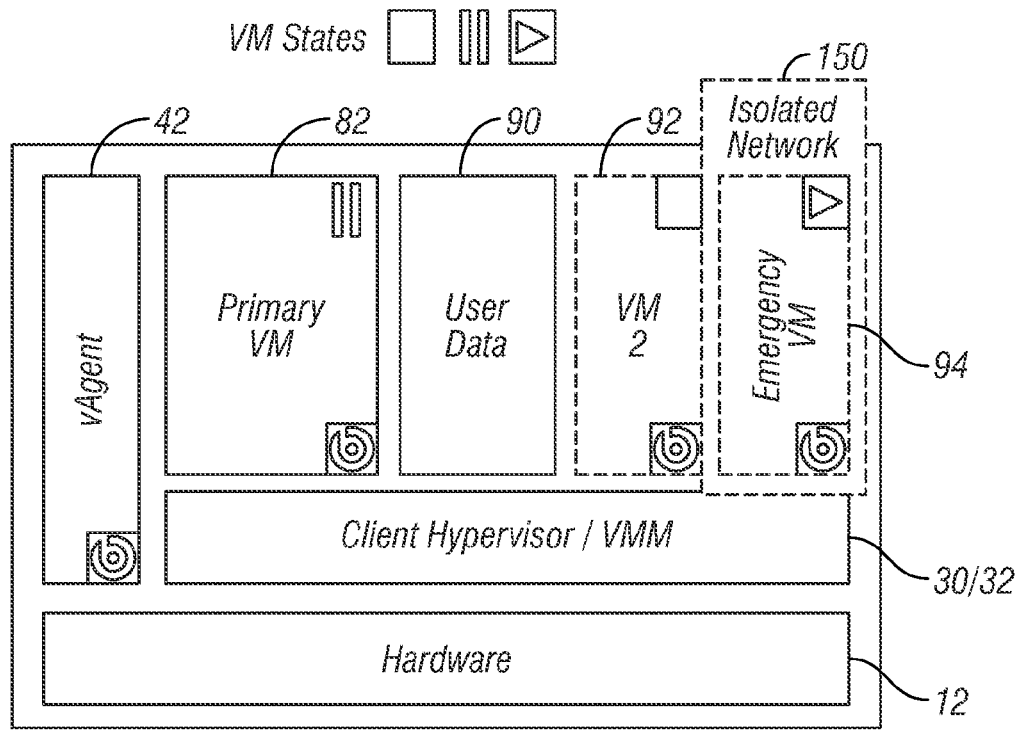
FIG. 16 is a third block schematic diagram of a computer architecture showing offline patching and configuration management via the vAgent architecture according to the invention.
Figure 17:
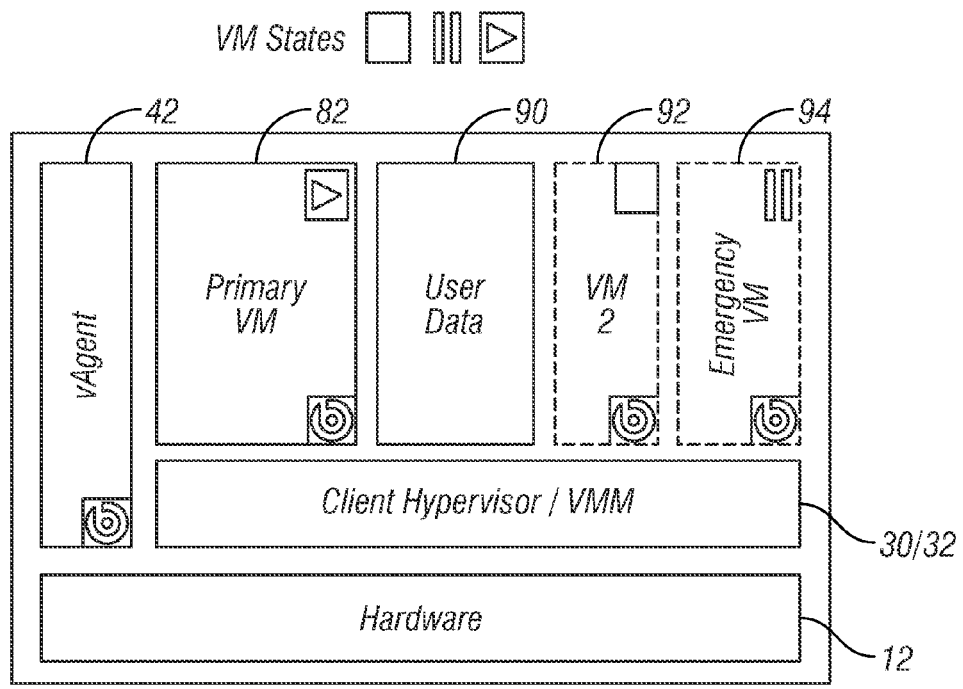
FIG. 17 is a fourth block schematic diagram of a computer architecture showing offline patching and configuration management via the vAgent architecture according to the invention.

In FIG. 14:
At pre-defined windows, vAgent triggers offline configuration management
vAgent pauses the Primary VM (optional)
vAgent restricts all network access to VMs, except secured Agent traffic
vAgent starts/unpauses images In FIG. 15:
vAgent isolates network for VM 150
vAgent starts VM
Agent in VM starts running
After Agent in VM completes it shuts system down In FIG. 16:
vAgent moves to next VM
If after pre-determined time, VM is not done, vAgent pauses system until next window In FIG. 17:
vAgent starts Primary VM again after window completes Virtual Management Appliance (VMA) Architecture FIG. 5 is discussed above in connection with the VMA architecture. One embodiment of the VMA comprises an Agent (vAgent) 50, a Relay (vRelay) 52, and a "Virtual Management Platform" 54 that runs in a vServer 42 within the hypervisor 30/32. The VMA has special privileges for inspection/management of the system, as is discussed in greater detail below.

Figure 18A:
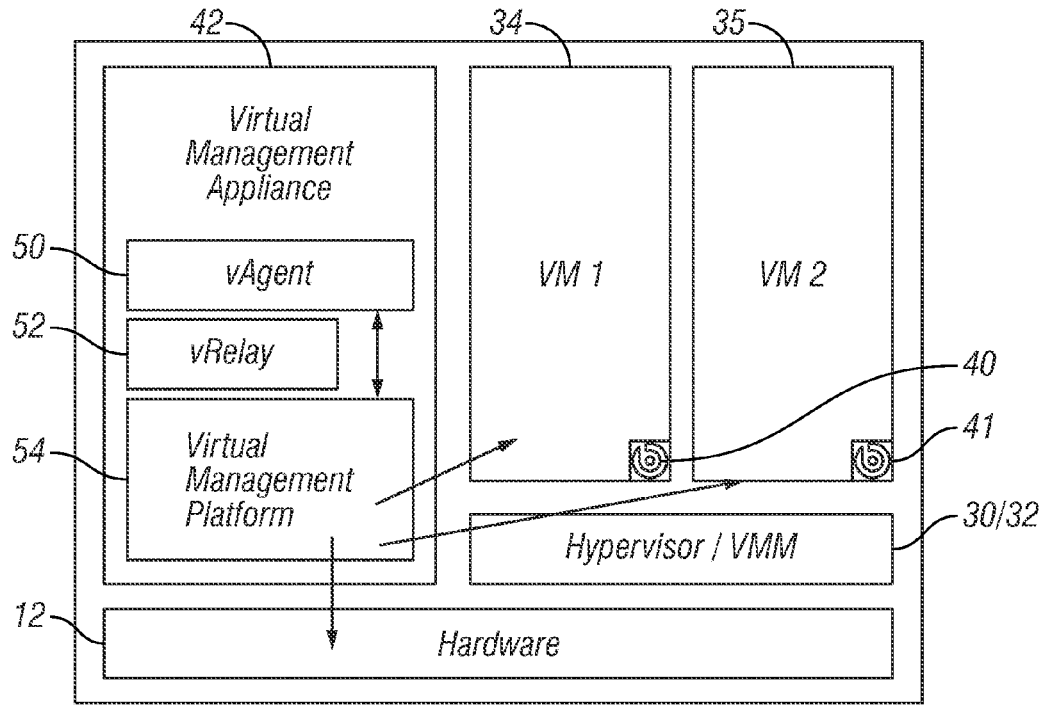
FIGS. 18*a* and 18*b* are block schematic diagrams of a computer architecture showing system inspection, agent communications, and management via the vAgent architecture according to the invention.
Figure 18B:
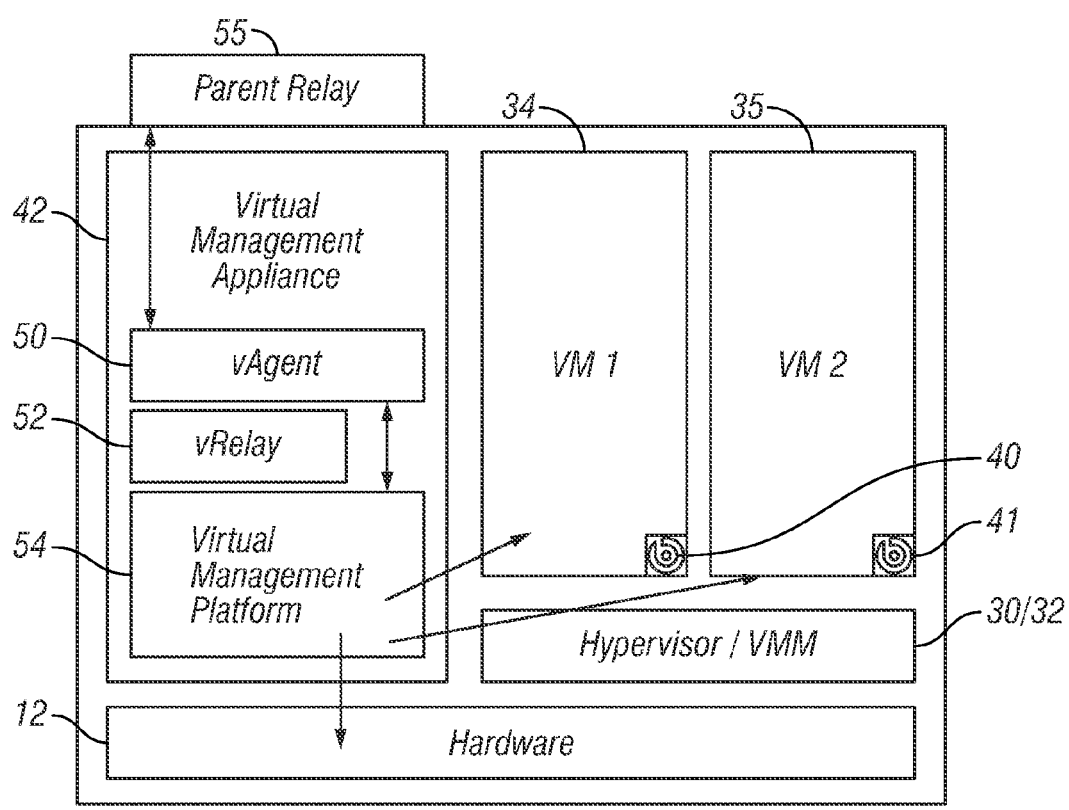

For example, FIGS. 18a and 18b are block schematic diagrams of a computer architecture showing system inspection, agent communications, and management via the vAgent architecture according to the invention. FIG. 18a shows inspection, as discussed below; while FIG. 18b involves the use of a parent relay 55 for such procedure.

With Regard to Inspection:
Virtual Management Platform interfaces with the hypervisor to allow inspection of system, for example:
VMs
Name, attributes, size, drivers, etc
States (Running, Stopped, Paused)
Hardware
CPU, memory, video card, etc.

Figure 19:
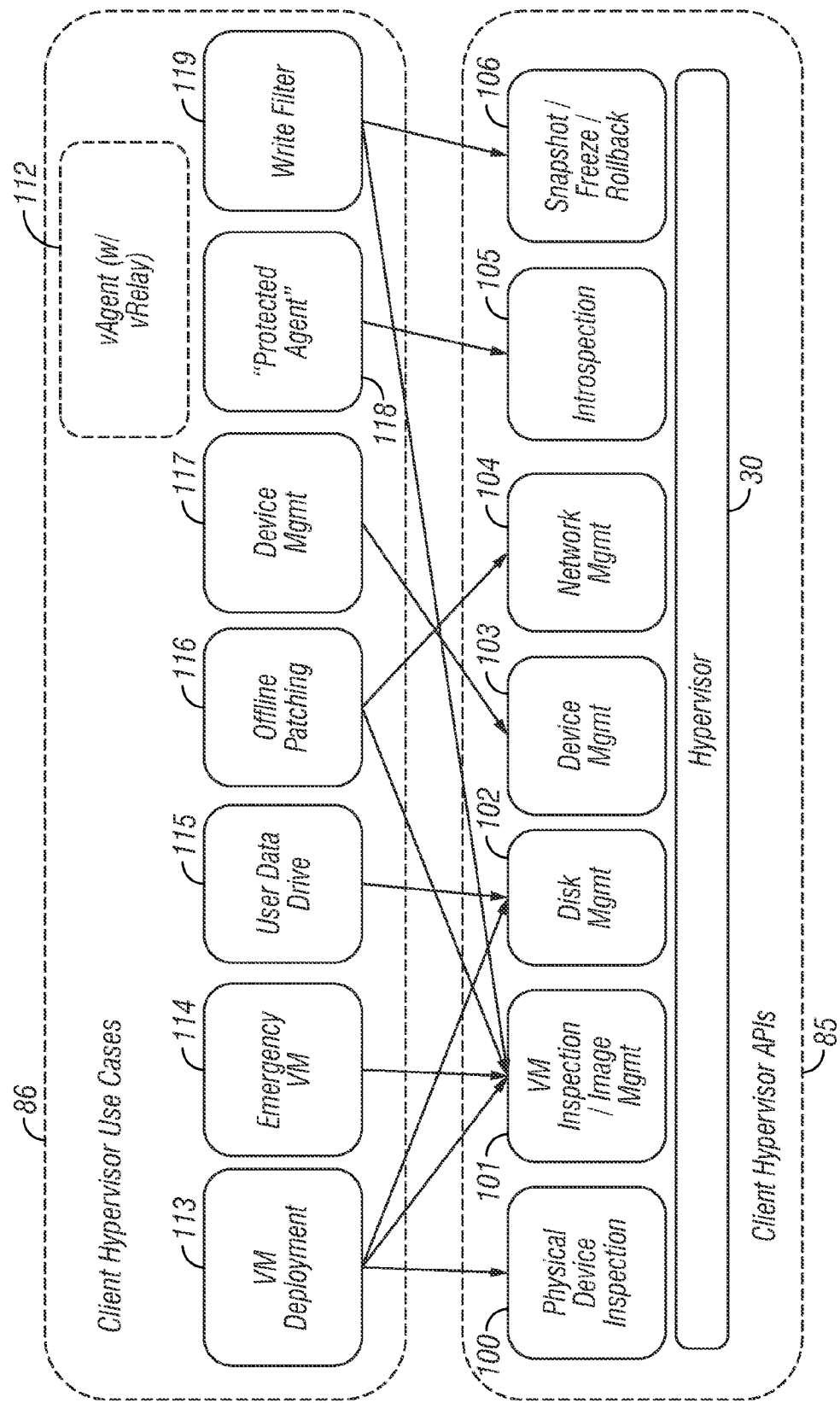
FIG. 19 is a block schematic diagram showing feature mapping in an endpoint virtualization platform according to the invention.

With Regard to Management:
Virtual Management Platform interfaces with the hypervisor to allow management of system
VM Management
Create, Delete, Start, Stop, Pause
Network Management
Control network options for system (bridge, NAT)
Control network options for VMs
Device Management
Enable/disable/read-only devices for each VM With Regard to Agent Communications:
Local Agents communicate through vRelay
More efficient
Easier to manage
vRelay communicates with Parent Relay
vRelay can be "promoted" to a full relay to service other computers Use Cases FIG. 19 is a block schematic diagram showing feature mapping in an endpoint virtualization platform according to the invention. Within the herein disclosed hypervisor 30 are a plurality of client hypervisor APIs 85 which support a plurality of client hypervisor use cases 86. FIG. 19 shows one possible mapping of use cases to APIs, where the functionality exposed by the API supports the application enabled by the use case.

Client hypervisor APIs may be thought of as a tool box for establishing use cases, and such APIs in this embodiment include: physical device inspection 100, VM inspection, image management 101, disk management 102, device management 103, network management 104, introspection 105, and snapshot/freeze/rollback 106. Many other APIs may be established within the scope of the invention.

The following use cases are provided in an embodiment of the invention, although those skilled in the art will appreciate that the invention is amenable to many other use cases: VM deployment 113, emergency VM 114, user data drive 115, offline patching 116, device management 117, "protected agent" 118, write filter 119, and agent w/vRelay 112.

Each use case is built upon hypervisor functionality that is exposed by the various APIs. For example, the VM deployment use case is built upon functionality exposed by the physical device inspection, VM inspection/image management, and disk management APIs.

The various APIs and use cases are discussed in greater detail below.

Security Partition, Including Out-of-Band Malware and Traffic Filtering

Technologies exist that allow appliances running in virtual machines to be configured to be security partitions, with permission to watch a variety low level data and events occurring in each of the virtual machines. For a security partition to perform its duties, it must be able to configure the hypervisor to pass events of interest to it. Events of interest include:

Loading a virtual memory page with execute permission
Passing low-level network communications packets thru logic that is allowed to decide if the data should be allowed to pass
Modifying the hardware registers of the virtual machine when the event service routine is exited, there by allowing the security partition to modify the behavior of the virtual machine executing the code
One can also envision a security partition that is provided with a hole host of virtual machine introspection capabilities over which the partition can observe departures from desired state Disk Encryption As users become increasingly mobile stolen or lost laptops are a major source of information leakage for the enterprise. There is a need to address security, compliance and personal concerns. In this embodiment individual VM image encryption, similar to full disk encryption contains the capabilities that can eliminate this leakage.

This embodiment will require several characteristics. Among them:
Procedure to recover data when password is lost
Procedure for creating, protecting, and backing up keys
Key and password rotation
Key and password complexity enforcement
Bootstrap from working OS on physical device to encrypted disk VM
Key rotation for situations where key is exposed (requires decrypt with old key/encrypt with new key). It is best if can perform these operations in a fashion where power loss can occur and you can pick up operation from where you left off.

In addition to the systems that currently exist for full disk encryption, VM encryption must also contain the ability to deal with decryption and exchange of keys across multiple hypervisors.

Trusted Computing Platform

Many enterprises would like assurances that the stack of software upon which their processes rely are in an expected state. A management layer that delivers out of band management even when the desktop images are failing is even more valued if the layer can provide some assurances that it has not been tampered with.

Trusted boot (tboot) is an open source project, specifically designed to verify that the Xen hypervisor and dom0 have proper hashes before they are bootstrapped. If the hash fails to match, it does not boot. There is also a TPM (trusted platform module) that can be loaded into dom0 that can detect if VM images are also in a known initial state. To establish a chain of trust, the following pieces of software should be valid:

Bios
Hypervisor
Dom0
Administrative environment
Administrative agent

The Administrative agent, with the help of introspectors, can establish even more confidence in the management of the overall system by detecting that each VM is running a proper and unaltered version of the agent. Trust can also be extended to include the emergency partition, or the corporate image.

Dual VM's

This is useful for situations where it is desirable to have multiple interactive desktops in use at once. An enterprise might like to separate personal and corporate work environments. It is also useful to have multiple running VMs in an OS migration scenario. It is also possible that particular vendor-specific applications can only run on particular versions of an operating system that is different than the primary workstation OS of a user. In this embodiment a user is able to have multiple running VMs, which are launched by the administrative agent.

The Adminstrative agent can set which VMs should boot and if the user is allowed to choose which VMs should be running. It is also able to set what types of devices can be connected to particular running VMs, for example a USB dongle can be attached to a personal VM but not to a corporate VM. It is also able to set certain network rules, such as connectivity for a personal VM only to port 80 and 25.

In a migration scenario multiple interactive VMs allow an enterprise to migrate a VMs data from an older operating system to a new VM without losing the original VM through reimaging. This preserves possible downtime or lost data that occurs in a non-hypervisor environment.

Deployment

Figure 20:
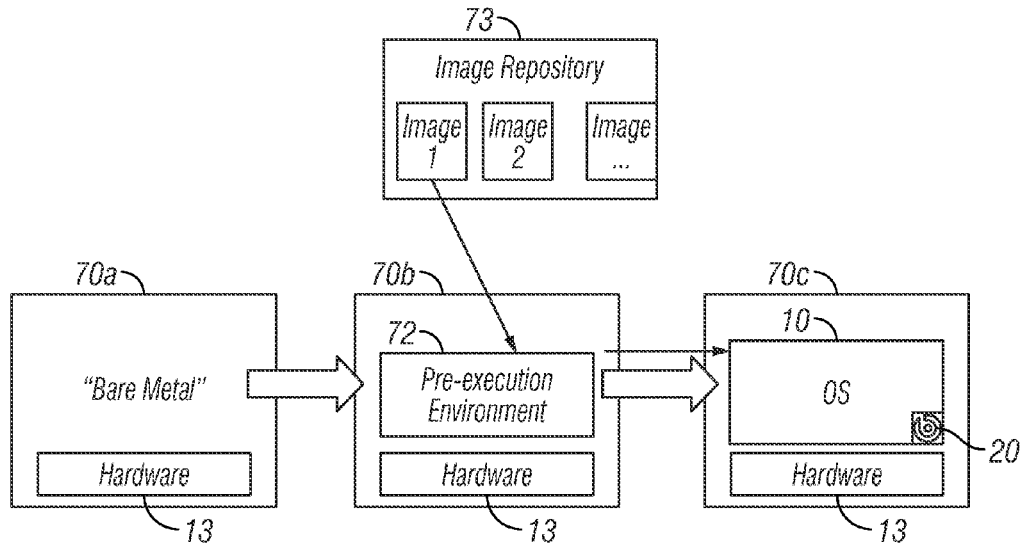
FIG. 20 is a block schematic diagram showing OS deployment in a state of the art computer architecture.

FIG. 20 is a block schematic diagram showing OS deployment in a state of the art computer architecture. In such system, the "bare metal" 70*a* hardware 13 is configured 70*b* with a pre-execution environment 72, to which imaged OS information 73 is added, and a resulting system 70*c* that includes that OS 10 and an agent 20. The drawbacks and limitations of this approach are described above.

Figure 21:
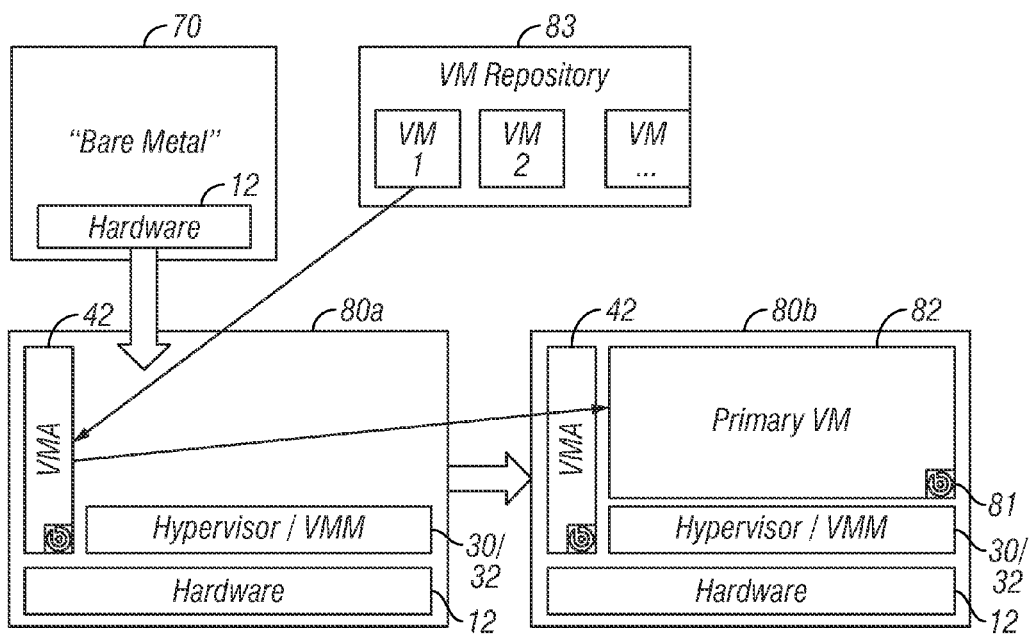
FIG. 21 is a block schematic diagram of a computer architecture showing OS deployment via the vAgent architecture according to the invention.

FIG. 21 is a block schematic diagram of a computer architecture showing OS deployment via the vAgent architecture according to the invention. In FIG. 21, the "bare metal" 70 hardware 12 is configured 80*a* with the herein disclosed hypervisor 30/32 and VMA 42, and receives under control of the VMA one or more virtual machine installations from a VM repository 83. The resulting configuration 80*b* establishes a system that comprises at least a primary VM 82 and related agent 81.

Flexible VM Deployment Options

Figure 22:
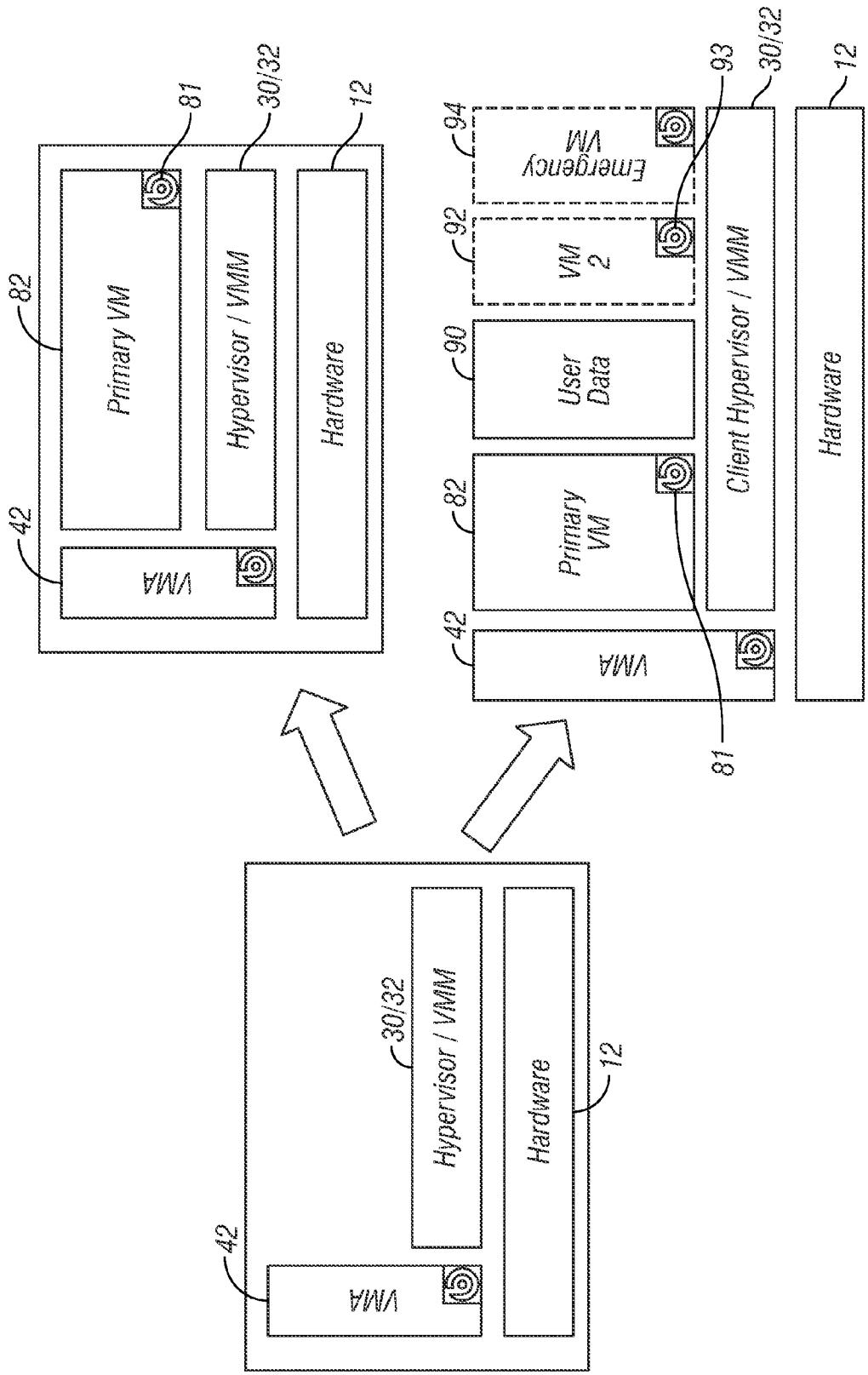
FIG. 22 is a block schematic diagram of a computer architecture showing OS deployment options via the vAgent architecture according to the invention.

FIG. 22 is a block schematic diagram of a computer architecture showing OS deployment options via the vAgent architecture according to the invention. As shown in FIG. 22, the VMA allows deployment of a primary VM 82 and related agent 81 (see FIG. 21) or a more sophisticated configuration that includes, for example but not limitation, a primary VM 82 and related agent 81, user data 90, a second virtual machine VM2 92 and related agent 93, and an emergency VM 94 and related agent 95. Thus, the invention allows for VMA control and supervision of any level and type of virtualized deployment.

Establishing Connectivity to Unresponsive Computers

This embodiment provides a collection of capabilities that allow remote access to each managed context. Some uses:

Diagnose network configuration issue
Diagnose agent failure to launch
Diagnose general user/helpdesk issues
Diagnose and possibly repair any issue for which physical access to the machine is not required In the most general form, this feature provides:

The ability to connect to a virtual machine that does not have network access. It could be that the networking abilities of the OS are misconfigured, yet we still want access so we can fix it.
The ability to connect to the Administrative environment in which the Administrative agent is running
The ability to connect to any virtual machine hosted by the hypervisor, even if it does not have a agent running on it.
The ability to connect to a virtual machine without installing any software inside it.
This capability must be protected by a robust and easily configured authentication mechanism.
The method should provide full GUI access (such as with VNC).

Figure 23:
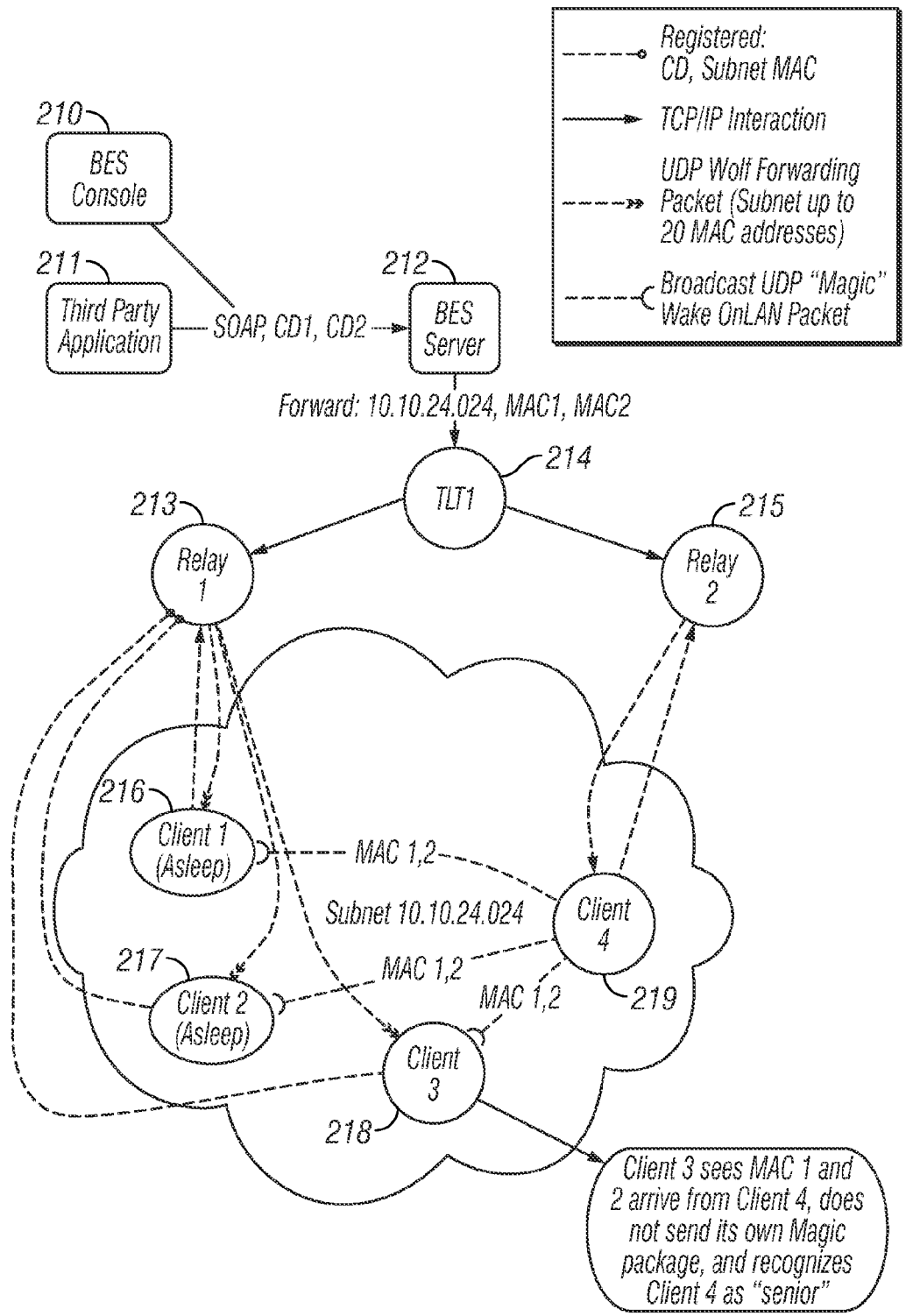
FIG. 23 is a block schematic diagram of a computer architecture showing a wake-on-LAN network configuration according to the invention.

There is a complex problem that has a lot of moving pieces. A presently preferred implementation has these attributes:

Establish a secure and authenticated connection.
Facilitate authentication and password management.
Allow DOMO access. From there the Administrative environment in which the Administrative agent is running can be accessed. This allows certain troubleshooting activity to be done.
Allow remote access into any VM running on the machine.
Assign KVM (keyboard, video, mouse) to the VM.
Provide for remote GUI and/or a terminal shell.
Share access to the active desktop, for helpdesk scenarios, either for view-only or view and control.
Other useful features, such as:
  Log connection events
  Log transfer of control
  On screen chat
  microphone/speaker voice FIG. 23 is a block schematic diagram of a computer architecture showing a network configuration for managing unresponsive computers according to another embodiment of the invention.

Users want to access and manage unresponsive computers instantly across the network by selecting the computer in the console interface. Users want to access and manage computers instantly across the network by running command line tools that integrate with other systems.

If an unresponsive computer shares a subnet with a responsive computer, no matter where they are in the relay hierarchy, it is possible to access the unresponsive computer within seconds.

Console

The console 210 has "right click" functionality that can target a single computer or a set of computers in any computer list. This functionality defaults to off, but can be turned on through a Dashboard API call. There is also a deployment option "kill switch" for this functionality. The Console sends a request to the Root Server 212 as a SOAP request with a set of ComputerIDs.

Server/Relay

The requests "enter" the server 212 through a SOAP post to the Root Server containing an arbitrary set of ComputerIDs. This interaction is meant to be open to third party integration: for example, an application 211 could get the ComputerIDs of computers in the "Pittsburgh Finance" department using a relevance query through the Web Reports SOAP API, and then could turn around and send that set of ComputerIDs to the root server.

The Server tracks three new pieces of information for each client: the MAC Address, the Subnet, and whether the client is willing to forward requests to other clients.

To send out a request, it uses the following algorithm:
Batch ComputerIDs into group by Subnet 214.
For each Subnet: Identify set of child Relays 213, 215 who have clients that (a) are in the same Subnet and (b) are willing to forward requests.
For each child Relay: Split the set of target computers 216-219 into batches of 20.
For each batch: Send an HTTP "HandleNotifyClient" request to the child relay that includes the target Subnet and MAC Addresses of all the target machines. Note that ComputerIDs are not sent to the child relays.
Identify set of directly reporting clients that are (a) in the same Subnet and (b) willing to forward requests.
For each child client: Split the set of target computers into batches of 20, for each batch: Send a UDP "WoLF Packet" to the child that includes the target Subnet and MAC Addresses of all the target machines.
When a Relay receives a "HandleNotifyClient" request from its parent, it follows essentially the same algorithm, i.e. it does not need to know the ComputerIDs of its targets, and it may not because they may be registered with another relay, because it can do targeting using only the Subnet. Also, it does not have to do any work to divide requests into batches because that has already been done by the parent.

Note that a consequence of this design is that notifications sent in a DSA deployment always ends up relying on the "loop detection" behavior between the servers to complete their routing. This is a consequence of routing by subnet instead of Computer ID, i.e. the servers do not have a way of telling which server a message belongs to, so they can end up sending the message back the way it came.

Client

Registration. At registration time, the Client sends up MAC Address and Subnet information for up to three network adapters. The registration url has been modified to contain the network adapter info by adding up to three instances of:
AdapterInfo=<mac address>_<cidr string>_<IP address>_<wolf enabled>
where:
<mac address> is the mac address formatted in hex digits with embedded dashes (0a-ff-00-0d-23-76).
<cidr string> is the subnet mask in cidr notation (192.168.100.0/24).
<IP address> is the IP address of the particular network adapter (192.168.100.23)
<wolf enabled> is 1 if the client is configured as a wake on LAN forwarder.

The client's parent Relay looks at the set of adapter information to see if any of the adapters match the IP address that the Client appears to be using to connect to the Relay. If it finds a match, it sends information on that single adapter up to its parent, so that the Subnet and MAC Address of the client are known all the way back to the Root Server, and back down to the Client, so that the Client knows which adapter it is using to talk to its parent.

Note that in this embodiment Relays are never able to resolve this information for Clients registering through NAT. If the information is not available, then the Client cannot be targeted for messages. The client receives confirmation that it is supposed to respond to forwarding packets by the presence of an http header labeled 'x bes wakeonlan adapterinfo' in the response to the registration attempt. If this response is not present, the forwarding functionality of the client is disabled.

When a relay's local client registers, the relay can not tell which adapter the client is using because the connection appears to come from 127.0.0.1. The relay forwards the set of adapter infos to the next parent, so that the same IP resolution mechanism can be used by the parent, and then the relay listens to the parent response to update its own registration list.

When the local client on a root server registers, the root server uses the first adapter that the client provides.

"Magic Packet" Forwarding

When the client receives a WoLF packet, it adds the set of MAC Addresses in the packet to its WakeOnLAN "Pending" list. The Client attempts to clear its "Pending" list at a maximum rate of about ten addresses per second by default: this setting is configurable. When the Client decides to send a "Magic Packet" it sends it out as a broadcast UDP message on the local subnet. This means that everyone in the subnet who is listening on the UDP port (usually 52311) receives the packet. Devices that are not listening on 52311 may send back "not listening" responses to the sender. Most importantly, the contents of the magic packet are detected by the target machine, and cause it to wake up.

When the Client sees a "Magic Packet" arrive on its UDP port, it checks the MAC Address in that packet against its "Pending" list. If the address is in the "Pending" list, it marks that entry as 'no longer pending' so as not to send the packet out redundantly, and it might also recognize that a "collision" has taken place. A "collision" means that the client had also sent a magic packet that matched the mac address sometime since the last time the list was emptied (see below).

Redundant WakeOnLAN requests generate unnecessary network traffic. To avoid excess network traffic, Clients go into a "quiet" mode when they detect they are colliding. The Client compares its IP Address with the IP Address of the Client it collided with. If it has a numerically lower IP address it stays active, otherwise it goes quiet. The "quiet" Client waits for 60 seconds before trying to respond to WoLF requests, so that the dominant Client has a chance to respond to the request, and redundancy is thus reduced. However, if the dominant Client does not appear to forward the WakeOnLAN request within 60 seconds, the "quiet" Client assumes that the dominant Client has left the Subnet or gone to sleep, and goes back 60 seconds. The "quiet" Client assumes that the dominant Client has left the Subnet or gone to sleep, and goes back to forwarding requests as soon as they arrive.

The clients empty their "Pending" lists after ten minutes of wake on LAN inactivity. Therefore, the forwarding is only capable of sending magic packets to wake up a particular computer after the subnet has been quiet of traffic for ten minutes.

To limit the size of the pending list, the client takes advantage of the fact that there are not more machines on the subnet than can be assigned IP addresses. On a /24 subnet, the client makes room for 255 items in its pending list. The client does not create a pending list larger than 1023 items in size.

"Client Configuration Settings"

The following settings control client wake on LAN forwarding functionality:

_BESClient_Comm_WakeOnLANForwardingEnable defaults to 0. Set to 1 to enable wake on LAN forwarding. In addition, to enable this functionality, setting _BESClient_Comm_ListenEnable must be set to 1.

_BESClient_Comm_WakeOnLANForwardingPacketsPerSecond defaults to 10. Minimum of 1, maximum of 100. Rate at which clients will keep total subnet traffic (ignoring redundant messages).

_BESClient_Comm_WakeOnLANForwardingSubnetPassword defaults to no password. Some NIC cards can be configured with a wake on LAN password. In this case, the magic packet looks different and includes the password.

_BESClient_Comm_WakeOnLANForwardingDebug Logging defaults to 0. Set to 1 to enable wake on LAN forwarding debug logging. Note that the debug messages go to the emsg log, so the emsg log must be enabled as well. Also note that the emsg detail must be set to at least 10. All wake on LAN debug messages are tagged with "UDPMessage".

The regular log also contains one of the following:
SetupListener as wake-on-LAN forwarder (AdapterInfo=<from server>)
SetupListener failed to initialize as wake-on-LAN forwarder (AdapterInfo= . . . )
SetupListener
ShutdownListener

DSA

The WakeOnLAN functionality interacts with DSA in the same way that other ClientRegister interactions do:

Registration interactions go straight to a single Root Server, and then the information provided by the registrations is periodically exchanged between Root Servers.

For downstream purposes, a Root Server thinks of its adjacent Root Servers as "Child Relays". It is possible that some Root Servers are not adjacent, and are reached through another Root Server.

Note that the WakeOnLAN functionality requires up to date registration information to determine the correct Subnet for a target client. If the information in the registration list is incorrect, then WakeOnLAN requests fail. Whenever a Client changes its Subnet, the information becomes incorrect, but any changes to its network interfaces should trigger a new registration. Although this is not always the case, i.e. minimum registration intervals can prevent Clients who change locations frequently from registering every time they change location. Once the registration is complete, the direct Root Server has up to date information, but sibling Root Servers continue to have the out of date information until ClientRegister replication takes place.

Magic Packet Passwords

Wake on LAN magic packets contain a spot for an eight-character password. Network adapters that can be configured to wake up the computer on receipt of a magic packet can also be configured to require a password as a part of the packet. Magic packets travel in the clear on the subnet and so the passwords are exposed to other machines on the subnet.

The limited security the passwords provide depends on how far the passwords travel. Implementations that send the passwords through other network segments in the clear, would be defeating the only plausible security the passwords provide. The existing implementation provides a simple level of support for those users that want to use magic packet passwords.

Reimaging

FIGS. 24a-24e are block schematic diagrams of a computer architecture showing a reimaging operation according to the invention.

Figure 24A:
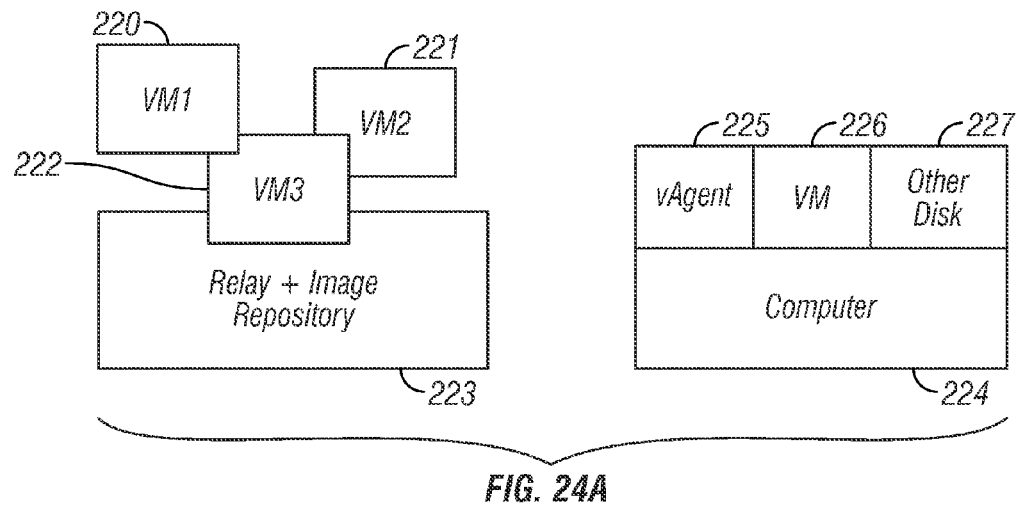

In FIG. 24a, three virtual machines 220, 221, 222 reside in a relay and image repository 223. A computer 224 includes a vAgent 225 which is accessed to reimage the computer, which currently has a virtual machine 226. A storage 227 is also provided.

Figure 24B:
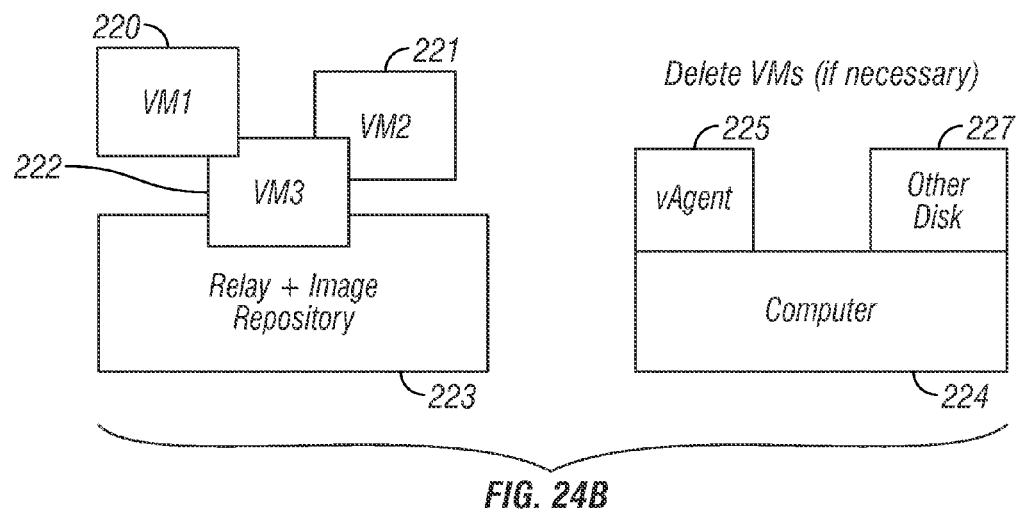

In FIG. 24b, any unnecessary virtual machines are deleted.

Figure 24C:
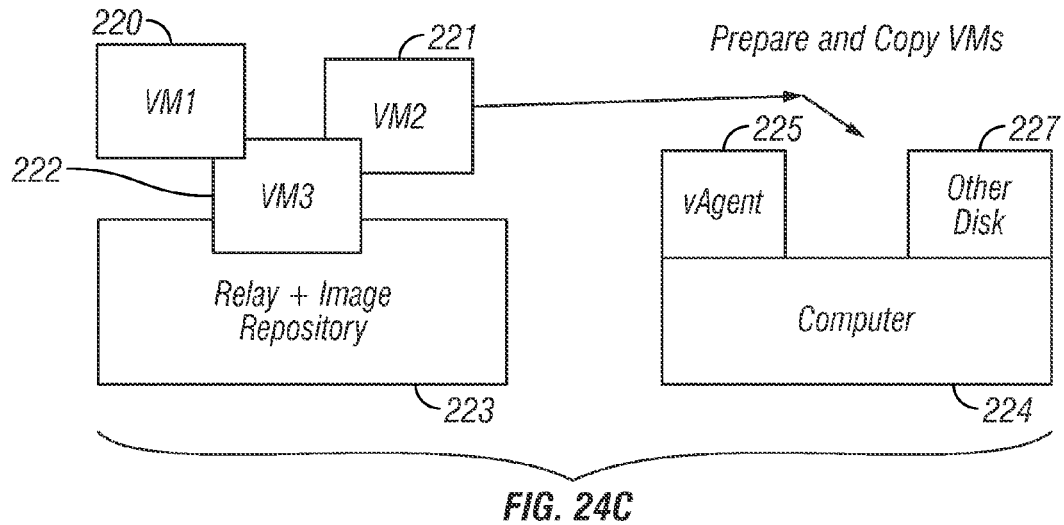

In FIG. 24c, the VMs to be installed are prepared and copied.

Figure 24D:
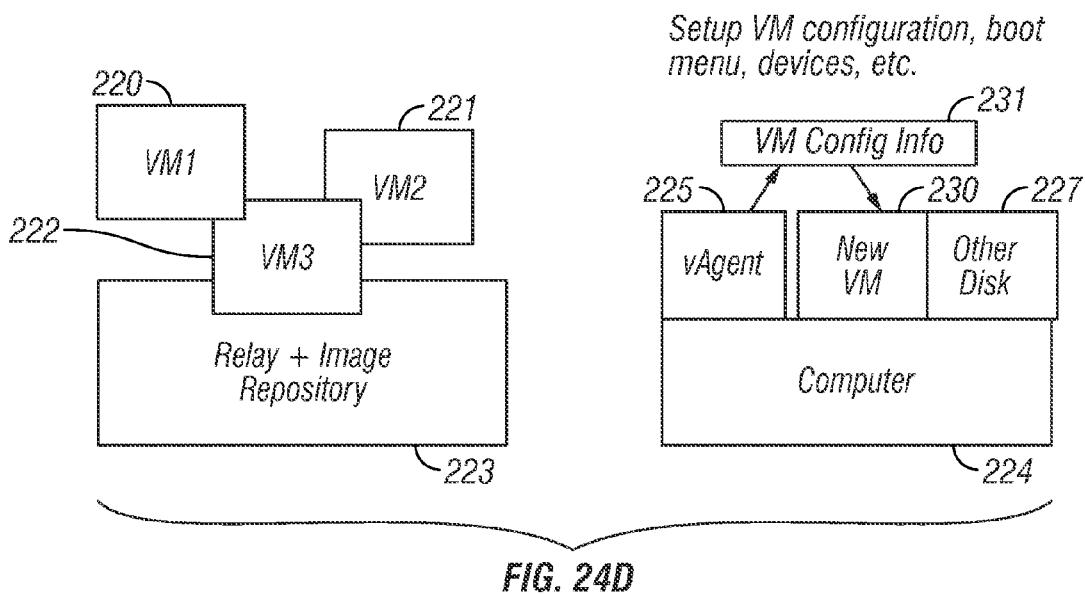

In FIG. 24d, the new VM 230 is installed, and VM configuration 231, boot menu, and devices are set up.

In FIG. 24e, OS configuration scripts 233 are injected for initial system setup.

VMP Functionality

Managing the Host Operating System from the Administrative Agent

Inspecting the Host

Because the host operating system is composed of software, it needs management. A typical set of Linux agent inspectors allows visibility and control of this context. However, to the extent that the host operating system context is obscured from the administrative context, as would be the case by instantiating the Administrative agent in a vServer, functionality available to a root processes running in the host operating system must be made available to the Administrative agent running inside the vServer.

Note that the following is not a functional decomposition of properties that must be exposed, but rather a list of operating system API's that need to function the same way when called from the Administrative agent context as if they were called from a root process running on the host operating system. If we were to run the Administrative agent in a virtual machine, we would need to implement and formalize techniques for interacting with the host operating system to manage it.

The native API's used by the BigFix (Emeryville, Calif.) Linux inspector library are:

```
file system read access to hosts files especially /proc and /dev,
file system APIs
    access          chmod
    close           closedir
    fclose          fcntl
    feof            fgetc
    fgets           fopen
    fread           fseek
    fsync           ftell
    ftruncate64         fwrite
    ioctl           lseek
    lseek64         mkdir
    mkdtemp             mkstemp
    open            opendir
    read            readdir_r
    readlink            rename
    rmdir           scandir
    symlink             umask
    ungetc          unlink
    utimes          write
mounted file system enumeration
    statfs          statvfs
launch process in host, wait for it to exit, get exit code
    fork            waitpid
    putenv
process enumeration in host, (file system access to /proc)
```

```
errno -- pass back error info from failed indirect calls
login session enumeration (users)
    getutid         endutent
    getutent        setutent
user groups
    getgrgid_r
network configuration
    freeaddrinfo    getaddrinfo
    getifaddrs      freeifaddrs
IP address of host
    gethostbyname_r
domain name and hostname of current host
    getdomainname   gethostname
user accounts inspection
    getpwuid_r      getpwnam_r
OS configuration of host computer
    uname           localtime_r
    nl_langinfo     setlocale
```

The above represents existing inspection capabilities. For the use cases disclosed herein, it is necessary to extend the inspection abilities to include:
  packages installed in host
  peripheral device characteristics
    types of removable devices—such as USB, CDROM
    mounted of removable devices
    access rules of removable devices
    manufacturer of mounted removable devices
    serial number of mounted removable devices
    label of mounted removable devices It would be useful to collect other properties of the network configuration:
  DHCP enabled
  DHCP server
  Dns server
  Gateway list
  Wake on LAN enabled
  Lease expires
  Link speed
  Type of network connection (wireless, Ethernet)
  Connection status of connection (connected, disconnected)
  MTU
  Manufacturer of network device Modifying the Host Using VMPAdmin Functions It is necessary to cause a shutdown or restart of the host computer. To manage the host OS from the Administrative agent, the following capabilities are necessary:
  copy, move, delete files in the host OS
  create and delete folders in the host OS
  copy files to or from the host OS and the administrative context
  create a file given a name and contents in the host OS
  run arbitrary shell script as root in the host OS
  run arbitrary executable as root in the host OS Managing the vServer from the Administrative Agent
Inspecting the vServer The current set of Linux agent inspectors allows sufficient visibility into the state of the administrative environment to manage it.

Modifying the vServer

The current set of operations currently offered by the Linux agents is sufficient to manage the vServer context.

Managing Source Images from the Administrative Agent
Source Image Enumeration and Identifying Attributes VMPAdmin API's for enumerating source images which should provide these identifying properties:
  Name
  Image path Source Image Attributes VMPAdmin API's for accessing these additional attributes of a source image:
  Capture time of source image
  Capture computer name of source image
  Operating system of source image
  Architecture of source image Virtual Machine Operations from the Administrative Agent
Create a Virtual Machine
Configure Resources of a Virtual Machine
  See Settable Virtual Machine attributes
  See Settable Virtual Machine device attributes Configuring the Boot Menu of a Virtual Machine VMPAdmin API's should allow configuration of the boot menu:
  API to get current 'Boot menu enabled', and for each virtual machine,
  API to get Boolean indicating the machine should appear in boot list
  API to get name as it would appear in the boot list
  API to enable or disable boot menu for machine
  API to enable or disable listing of each VM in boot menu
  API to set name that will appear in boot list of VM in boot menu
  API to Configure VM boot order. For each virtual machine, be able to specify an ordering integer. If these are ambiguous, put them alphabetically in the boot list.

Bootstrap Virtual Machine

VMPAdmin API's should allow the bootstrap of a virtual machine from an image source:
  Specify source image
  Configure virtual machine to mount CDROM/ISO/boot source image file for mounting to VM
  Specify resource allocation, image path, VM name, OS is booted, VM attributes are captured.

Change Running State of Virtual Machine

A VMPAdmin API is required to change the running state of virtual machines:
  Start a VM
  Shutdown/Restart a VM
  Pause VM
  Resume VM Delete a Virtual Machine A VMPAdmin API is required to delete a virtual machine and its data from disk:
  Remove a VM image.
  Remove a VM image with secure wipe.

Managing Vm Containers from the Administrative Agent
Virtual Machine Enumeration and Identifying Attributes VMPAdmin API's to enumerating virtual machines should provide these identifying attributes:
  Name
  Image path
  GUID (need a technique to generate these uniquely)
  Note: It is desirable that the enumeration functions produce the virtual machines in the same order they are traversed when processing the device access rules.

Virtual Machine Attributes

VMPAdmin API's to access these additional attributes of a virtual machine:
  Creation time of virtual machine
  CPU allocation of virtual machine
  RAM allocation of virtual machine
  Disk allocation of virtual machine
  Network adapter allocation of virtual machine Last run time of virtual machine
Last boot time of virtual machine
Running state of virtual machine (running, paused, stopped)
Show in boot menu of virtual machine
Boot menu entry of virtual machine
Boot menu order of virtual machine
Primary VM of virtual machine
Device access rules of virtual machine
Device pass-through attributes of virtual machine Settable Virtual Machine Attributes
VMPAdmin API's to set these virtual machine attributes
CPU allocation of virtual machine
RAM allocation of virtual machine
Disk allocation of virtual machine
Network adapter allocation of virtual machine
Name of virtual machine
Device access rules of virtual machine
Show in boot menu of virtual machine
Boot menu entry of virtual machine
Primary VM of virtual machine Configured Device Enumeration and Identifying Attributes
VMPAdmin API's to enumerate configured devices of a virtual machine producing these identifying attributes:
Device id—unique id of the device Configured Device Attributes
VMPAdmin API's to access these additional attributes of a configured device:
Name of device
Type of device
Device pass-through mode
Device access rules
Mounted of device
Manufacturer of media in device
Serial number of media in device
Label of media in device
Note: It is desirable that the enumeration functions produce the access rules in the same order they are traversed when processing the device access rules.

Settable Virtual Machine Device Attributes
VMPAdmin API's to set virtual machine device attributes:
Set pass-through of device given the virtual machine image name and the device id.
Attach/Detach Device to VM VMPAdmin API Functionality:
API's to attach or detach a device to a virtual machine given the device id.

Virtual Machine Process Enumeration and Identifying Attributes
VMPAdmin API's to enumerate processes running in a virtual machine producing these identifying attributes:
process id
process full path as seen inside virtual machine
process start time.

Virtual Machine Process Attributes
VMPAdmin API's to get these attributes of a file (given its full path as seen inside the virtual machine):
Version number.
Size
Creation time
Last modification time
Sha1
Value of named resource Virtual Machine Network Isolation
VMPAdmin API's to limit and restore network traffic to a virtual machine. these attributes of a file, given its full path as seen inside the virtual machine:

Virtual Machine Disable Device
VMPAdmin API's to disable and restore access to a device to a virtual machine.

Virtual Machine Persistence Mode
VMPAdmin API's to set persistence mode of a virtual machine.

VMPGuest Functions
Get VM Agent Communications Configuration
VMPGuest API to query communications configuration (parent relay to gather, report, download from).
Get device pass-through configuration
VMPGuest API to query current device pass-through configuration given device ID VMPAdmin—Data Drive Functions
Data Drives Enumeration and Identifying Attributes
VMPAdmin API's to enumerate data drives and producing these identifying attributes:
Name
Image path
GUID (need a technique to generate these uniquely)

Data Drive Attributes
VMPAdmin API's to get these attributes of a data drive:
Creation date
File system type
Size
Used Size
Path
Share name
date last modified
date last mounted
mount status
names of VMs in which it is currently mounted,
names of VMs in which it is configured to be mounted Data Drive Operations
VMPAdmin API's to perform these operations of data drives:
Create a data drive given size, file system type, path, and data drive name
Configure a data drive for mount/unmount on boot given a VM name and data drive name
Delete a data drive given a path and data drive name
Provide the ability to mount/unmount drive in a Administrative environment while also mounted in VM
Provide the ability to set the persistence mode of the data drive independent of the persistence mode of the virtual machine in which it is mounted.

VMPAdmin—Miscellaneous Operations
Set Network Mode
VMPAdmin API to set network mode to Bridge or NAT. As a part of this, IP forwarding rules must also be setup in the host context.

VMPAdmin to VMPGuest Communications
Information must flow between the VMPAdmin to the VMPGuest and back.
Interactions are queries from the VMPGuest to the VMPAdmin for configuration information, as well as commands from the VMPAdmin to the VMPGuest. For instance, if the VMPGuest is running, it can be used by the VMPAdmin to display a message to the end user. This implies that the VMPAdmin can send commands to the VMPGuest as well. An embodiment of the invention establishes an opaque protocol where the requests can be sent and responses received without any understanding of the contents of the requests or responses.
These take the form of:
VMPAdmin function to send opaque data to VMGuest given VMGUID VMPAdmin function to receive opaque data from VMGuest, collects data and VMGUID. It is important that no cross talk between guests is allowed.

VMPGuest function to send opaque data to VMPAdmin.

VMPGuest function to receive opaque data from VMPAdmin. Note that no other VMPGuest should be able to see this data (it should not appear in other VMGuest memory).

Using the above, VMGuest to VMGuest communications is also possible with coordination and approval of the VMPAdmin.

Set VM Agent Communications Configuration

VMPAdmin API to set VM agent IP address to register through and parent relay to gather, report, and download from because it bypasses the forwarder for these communications and communicate directly with the parent relay selected by the Administrative agent.

Delete Physical

The VMPAdmin API should be able to wipe an entire disk (hypervisor, Debian, all VM's, vServer, etc.) A form of this should perform a secure wipe of the disk bytes.

End User—Message Display and Response

VMPAdmin API's to display a message box to the end user, and get back response. In an embodiment, the API to display the message box receives a text string to display, and some configuration of what user interface buttons to display (Okay, done, cancel), and it returns a response id, and the API to collect the response can specify which response id is to be collected.

Relay Implementation

The following inspectors are required to support relay selection and registration:

VMPAdmin API Functionality and VMPAgent API Functionality

AdministrativeAgent=true if client is running in a Administrative environment,

VMAgent=true if client is running in a VM

AdministrativeRelay=true if relay is running inside the Administrative environment.

AdministrativeForwarder=true if NotificationForwarder is running

BridgeMode=true if running in bridge network mode

NATMode=true if running in NAT network mode

Relay Selection Agent Logic—pseudo code of relay selection that works in either Administrative agent, the VM agent, or an agent running on a physical machine:

```
if ( 'AdministrativeAgent' )
    if ( 'AdministrativeRelay' )
        select parent relay based on configuration.
        Register on loopback with IP address of
            NATMode: host as notification IP address
            BridgeMode: vServer as notification IP address
        Set VM Communications Configuration (let VM agents
    relay select)
    Else if 'AdministrativeForwarder'
        select parent relay based on configuration.
        Register on loopback with IP address of
            NATMode: host as notification IP address
            BridgeMode: vServer as notification IP address
        Set VM Communications Configuration
            Set gathering IP address to parent relay
            Set local registration IP address to vServer IP
        address
    Else
        Select parent relay based on configuration
        Register non-loopback with IP address of:
            NATMode: host as notification IP address
            BridgeMode: vServer as notification IP address
```

-continued

```
        Set VM Communications Configuration
            Set gathering IP address to parent relay
            Set local registration IP address to parent relay
    endif
else if ( 'VMAgent' )
    if(local registration IP address is not empty ))
        register with local registration IP address with NAT address
        Get VM Communications Configuration
    else
        Select parent relay based on configuration
        Register non-loopback with IP address of:
            NATMode: host as notification IP address
            BridgeMode: vServer as notification IP address
        Communicate with selected parent relay
    endif
else
    // normal client relay selection behavior
    ...
endif
```

VMPAdmin API Functionality

API's for inspecting all items listed above

APIs to perform these operations or changes of state:

NAT mode/bridge mode. This needs to also setup the port forwarding rule to send deployment traffic to the Administrative environment.

Set VM Agent Communications configuration

VMPGuest API Functionality

API's for inspecting all items listed above

API to Get VM Agent Communications Configuration

Virtual Machine Properties

These attributes should be available about each virtual machine from the Administrative agent context.

General Attributes of each virtual machine:
a. Name of virtual machine
b. Boot menu name of virtual machine
c. GUID of virtual machine
d. Path of image virtual machine
e. Size of image virtual machine
f. last modified time of virtual machine
g. last boot time of virtual machine
h. running state of virtual machine Attributes of image at capture time:
a. capture time of source image
b. capture name of source image
c. capture computer of source image
d. operating system of source image
e. architecture of source image Attributes captured at VM provisioning time:
a. creation date of provisioned virtual machine
b. source image of provisioned virtual machine
  i. capture time of source image of provisioned virtual machine
  ii. capture name of source image of provisioned virtual machine
  iii. capture computer of source image of provisioned virtual machine
  iv. operating system of source image of provisioned virtual machine
  v. architecture of source image of provisioned virtual machine.

Resources allotted to virtual machine:
a. CPU
b. RAM
c. Disk
d. Devices
  i. access rules
  ii. driver model (pass-through, or hypervisor)

Figure 25:
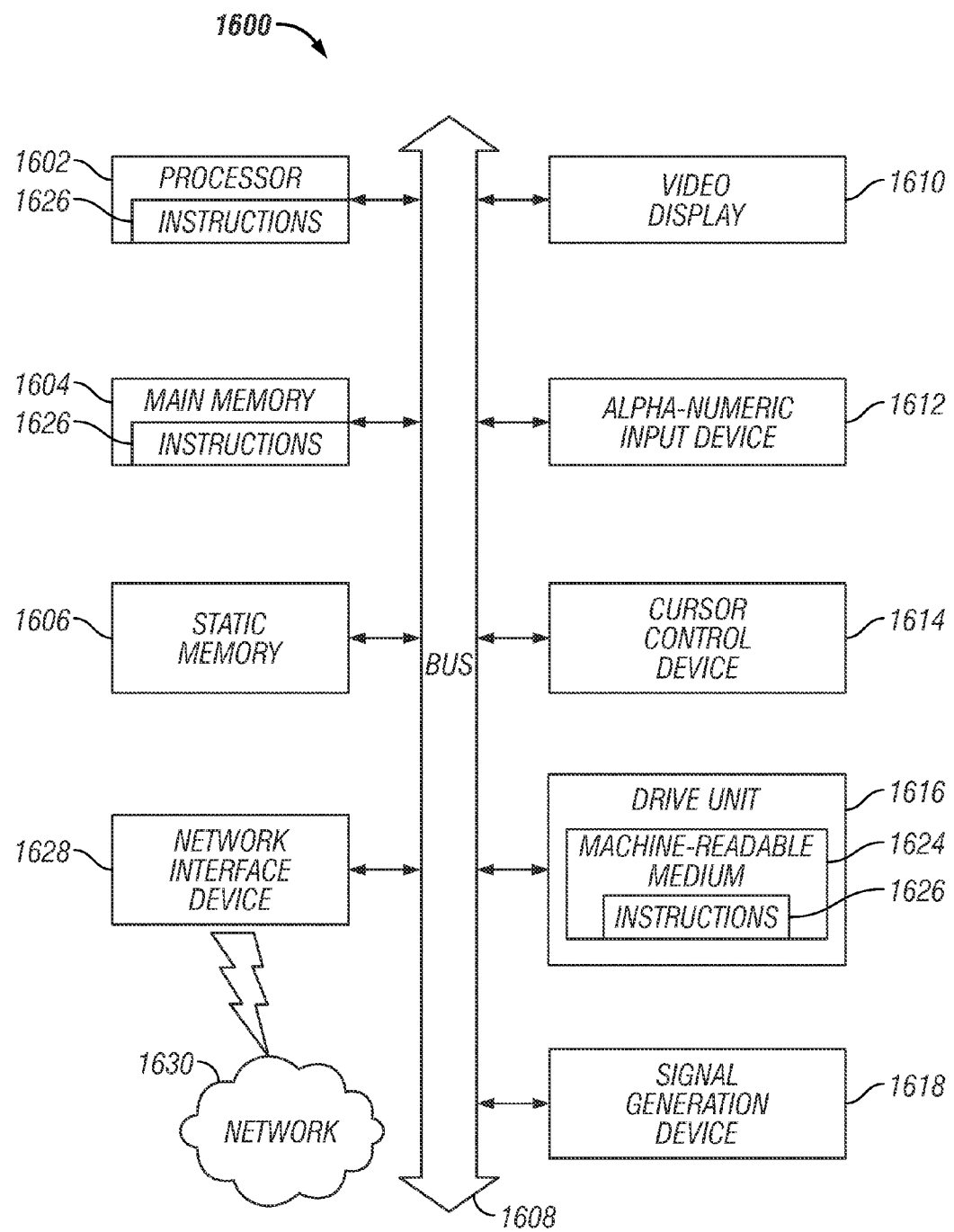
FIG. 25 is a block schematic diagram of a machine in the exemplary form of a computer system within which a set of instructions for causing the machine to perform any one of the foregoing methodologies may be executed.

Network configuration:
  a. VM status (running paused, stopped)
  b. VM Name
  c. GUID of virtual machine
  d. Disk image file
Image attributes saved when image is captured:
  ImageSourceComputer=name of machine on which image was captured.
  SourceOperatingSystem=name of OS
  Architecture=(x86, ia64, x64, etc.)
  TimeCaptured=seconds since epoch
  FriendlyTimeCaptured=Mime time
  DiskSizeAtCapture=disk space used at time of capture (as seen from the agent)
Other image attributes:
  time VM was last modified
  time VM was last boot time
  time VM was created Machine Implementation FIG. 25 is a block schematic diagram of a machine in the exemplary form of a computer system 1600 within which a set of instructions for causing the machine to perform any one of the foregoing methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with complementary metal oxide semiconductor (CMOS), transistor-transistor logic (TTL), very large systems integration (VLSI), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus, comprising a processor and a memory, for simultaneously using multiple interactive desktops, comprising:
  a hypervisor-resident, policy-based, virtual management agent running in a privileged context of the hypervisor on the processor and configured to manage a host OS from outside the OS, the host OS comprising a plurality of virtual machines (VMs), each VM running on a respective underlying hardware-based device;
  an administrative agent, executing on the processor, configured to launch each VM and to set Which VM should boot;
  a client hosted virtual desktop running within the underlying hardware-based device, the client hosted virtual desktop comprising the hypervisor, wherein the hypervisor is configured to support an administrative environment comprising a virtual management appliance, the virtual management appliance comprising the administrative agent, a virtual relay, and a virtual management platform, the hypervisor also configured to support the plurality of VMs, each VM having a respective virtual machine agent; and
  a parent relay configured for inspection, wherein the virtual management platform interfaces with the hypervisor to allow inspection of the hardware-based device, and wherein the virtual management platform interfaces with the hypervisor to allow management of the hardware-based device.

2. The apparatus of claim 1, wherein the administrative agent is configured to deter nine if a user is allowed to choose which VMs should be running.

3. The apparatus of claim 1, wherein the administrative agent is configured to determine what types of devices can be connected to a particular running VMs.

4. The apparatus of claim 1, wherein the administrative agent is configured to determine network rules.

5. The apparatus of claim 1, wherein the administrative agent is configured to use reimaging in an enterprise to migrate data for an original VM from an older OS to a new VM without losing the original VM.

6. The apparatus of claim 1, wherein the virtual manage agent comprises a management layer between the OS and the hardware-based device.

7. The apparatus of claim 1, wherein the virtual management agent is configured to execute a relevance-based computing model, to interact with one or more inspectors, and to implement actions to address systems-management operations.

8. The apparatus of claim 1, wherein the virtual management agent is configured to interact with a hypervisor-based virtual data-drive for segregation and management of user-data separate from the hardware-based device.

9. The apparatus of claim 8, wherein the data drive is configured for at least one of separating specific data from a VM in the plurality of VMs, sharing data between the plurality of VMs, or storing user or application data, and wherein the data drive is configured to be backed up, copied, or moved as a container.

10. The apparatus of claim 8, wherein the data drive is configured to mount a VM in the plurality of VMs as a file system to collect files left on another VM in the plurality of VMs.

11. The apparatus of claim 1, wherein the virtual management agent interacts with a relay component running in a virtual management layer, and wherein the apparatus further comprises a networking configuration for the virtual management agent and relay component.

12. The apparatus of claim 11, wherein the relay component provides services to the virtual management agent as well as agents residing in the plurality of VMs managed by the virtual management agent.

13. The apparatus of claim 1, wherein the virtual management agent is configured as one or more endpoint hypervisors and for dynamic grid computing by way of virtual computing appliances.

14. The apparatus of claim 1, further comprising an emergency VM configured to:
allow user access to the hardware-based device if a primary corrupted, infected, or otherwise compromised; and
emulate the hardware-based device for ease-of-management and/or ease-of-deployment.

15. The apparatus of claim 1, further comprising a virtual data drive configured to perform at least one of:
separating specific data from a VM;
sharing data between VMs;
storing user and/or application data;
being backed up, copied, and/or moved as a container; and
mounting a VM as a file system to collect files left on another VM.

16. The apparatus of claim 15, the virtual data drive comprising:
a user data drive configured to store specific user information separate from the plurality of VMs, wherein user data is portable between VMs in the plurality of VMs, and hardware-based devices.

17. The apparatus of claim 1, further comprising a protected agent configured to control and protect the hardware-based devices against tampering, wherein:
the protected agent provides access by users to gain control of the hardware-based devices; and
the protected agent provides administrators a mechanism to disable the protected agent;
the protected agent is configured to allow the virtual machine agent to look inside the VM to ensure that a VM agent is running; and
if the VM agent is not running, the virtual machine agent can take at least one of the following actions:
report a violation;
pop a message to a VM user;
restrict network access;
stop/pause the VM; and
install/start the agent.

18. The apparatus of claim 17, further comprising:
a heartbeat for a protected agent, wherein the protected agent is configured to allow the virtual machine agent to monitor a VM agent;
wherein the virtual machine agent is configured to listen on an event channel;
wherein the VM agent repeatedly sends a heartbeat message on the event channel;
wherein if the virtual machine does not receive a heartbeat message for a predetermined time period, a fixlet becomes relevant that indicates that the VM agent not working; and
wherein if the virtual machine agent notices that a VM agent is not running in the VM, remediation actions are taken that include any of mounting a CD/USB drive to start or install the VM agent, stopping the VM, and cutting off network access.

19. The apparatus of claim 1, the hypervisor comprising a plurality of client hypervisor APIs which support a plurality of client hypervisor use cases, wherein the APIs comprise any of:
physical device inspection;
VM inspection, image management;
disk management;
device management;
network management;
introspection; and
snapshot/freeze/rollback.

20. The apparatus of claim 19, the hypervisor use cases comprising at least one of:
VM deployment;
emergency VM;
user data drive;
offline patching;
device management;
protected agent; and
agent with virtual relay.

* * * * *